United States Patent
Stern et al.

(10) Patent No.: US 9,121,442 B2
(45) Date of Patent: Sep. 1, 2015

(54) POLYMERIC BEARING ARTICLES FOR USE IN ULTRA-HIGH PRESSURE AND VELOCITY ENVIRONMENTS

(75) Inventors: Brian A. Stern, Duluth, GA (US); Yuhong Wu, Alpharetta, GA (US); Stephen Estberg, West Chester, PA (US); Tanya Berfield, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 13/883,966

(22) PCT Filed: Nov. 10, 2011

(86) PCT No.: PCT/EP2011/069831
§ 371 (c)(1),
(2), (4) Date: May 7, 2013

(87) PCT Pub. No.: WO2012/062851
PCT Pub. Date: May 18, 2012

(65) Prior Publication Data
US 2013/0334006 A1    Dec. 19, 2013

Related U.S. Application Data

(60) Provisional application No. 61/412,789, filed on Nov. 11, 2010.

(51) Int. Cl.
*F16C 17/04*     (2006.01)
*F16C 33/10*     (2006.01)
(Continued)

(52) U.S. Cl.
CPC ............. *F16C 17/04* (2013.01); *F16C 33/1065* (2013.01); *F16C 33/201* (2013.01); *F16D 13/64* (2013.01)

(58) Field of Classification Search
CPC ........ F16C 17/04; F16C 33/20; F16C 33/201; F16C 33/1065
USPC ......... 384/276, 283, 286, 291, 292, 297, 305, 384/368, 420, 909
See application file for complete search history.

(56) References Cited

U.S. PATENT DOCUMENTS 1,700,856 A * 2/1929 Schein .......................... 384/368
4,757,887 A * 7/1988 Ostrander et al. .......... 192/41 A
(Continued)

OTHER PUBLICATIONS

Standard ASTM D3702-94 (Reapproved 2009), "Standard Test Method for Wear Rate and Coefficient of Friction of Materials in Self-Lubricated Rubbing Contact Using a Thrust Washer Testing Machine", 1994 (Reapproved 2009), ASTM International, pp. 1-5; 5 pgs.

(Continued)

*Primary Examiner* — Phillip A Johnson

(57) ABSTRACT

A polymeric thrust bearing is provided for an ultra-high PV environment. The polymeric thrust bearing includes an annular bearing body having an inner perimeter and an outer perimeter, and a plurality of lubricant channels extending across the annular bearing body from the inner perimeter to the outer perimeter. The annular bearing body comprises a polymer composition comprising a polymer having typically a glass transition temperature of at least about 140° C., such as an aromatic polyimide or a poly(aryl ether ketone), and at least one friction and wear additive. The polymeric thrust bearing is configured to withstand a velocity and a pressure in a lubricated environment in which the product of the velocity and the pressure is about 1,100,000 psi-fpm (23540 kg/cm²× m/min) or more.

21 Claims, 15 Drawing Sheets

(51) Int. Cl.
*F16N 1/00* (2006.01)
*F16C 33/20* (2006.01)
*F16D 13/64* (2006.01)

(56) References Cited

U.S. PATENT DOCUMENTS

| | | | |
|---|---|---|---|
| 4,849,469 A * | 7/1989 | Crosby et al. | 524/439 |
| 6,502,994 B2 * | 1/2003 | Jackson | 384/420 |
| 2005/0157964 A1 * | 7/2005 | Kawagoe et al. | 384/276 |
| 2006/0025507 A1 * | 2/2006 | Moore et al. | 524/275 |
| 2008/0039574 A1 * | 2/2008 | Nagao et al. | 524/496 |

OTHER PUBLICATIONS

[Unknown Author] Solvay Advanced Polymers, "Torlon Resins Engineering Data", Jan. 1, 2002—XP009155667—Retrieved from the Internet : URL:http://www.hycompinc.com/PDFs/Torlon%20Design%20Manual.pdf; 53 pgs.

[Unknown Author] Kantoor En Efficiency, Magenta Communicatieprojecten, Wijchen, NL, "Geringere Kosten durch Hochleistungskunststoffe", Lower costs through high-performance plastics, Jan. 1, 2009, n° 3, XP002590567—Retrieved from the Internet : URL:http://imperia.mi-verlag.de/imperia/md/content/ai/kon/fachartikel/ke/2009/03/ke09_03_044.pdf; pp. 44-45,; 3 pgs. Includes abstract.

* cited by examiner

POLYMERIC BEARING ARTICLES FOR USE IN ULTRA-HIGH PRESSURE AND VELOCITY ENVIRONMENTS

CROSS-REFERENCE TO RELATED APPLICATIONS

This application is a U.S. national stage entry under 35 U.S.C. §371 of International Application No. PCT/EP2011/069831 filed Nov. 10, 2011, which claims priority to U.S. provisional application 61/412,789, filed on Nov. 11, 2010, the whole content of this application being incorporated herein by reference for all purposes.

FIELD

The present disclosure relates generally to bearing articles and more particularly to polymeric bearing articles for use in ultra-high pressure and velocity environments.

BACKGROUND

Bearings are commonly used to reduce friction vis-à-vis a rotating surface. In ultra-high pressure and velocity (PV) environments (i.e., in environments or under conditions in which the product of the pressure and the velocity equals or exceeds about 1,100,000 psi-fpm (23540 kg/cm$^2$×m/min), such as in various modern automotive transmissions and drivetrain systems), bearing components are conventionally made of metal to withstand the loads and speeds that are common in such environments while having suitable wear performance. Exemplary types of bearings used in such ultra-high PV applications include steel needle bearings and ball bearings.

SUMMARY

In one aspect, a polymeric thrust bearing is provided for an ultra-high PV environment. The polymeric thrust bearing includes an annular bearing body having an inner perimeter and an outer perimeter, and a plurality of lubricant channels extending across the annular bearing body from the inner perimeter to the outer perimeter. The annular bearing body comprises a polymer composition comprising at least one polymer having a glass transition temperature of at least about 140° C. and at least one friction and wear additive. The polymeric thrust bearing is configured to withstand a velocity and a pressure in a lubricated environment in which the product of the velocity and the pressure is about 1,100,000 psi-fpm (23540 kg/cm$^2$×m/min) or more.

In another aspect a method is provided for utilizing a polymeric bearing article in an ultra-high PV environment. The method includes subjecting the polymeric bearing article to a velocity and a pressure such that the product of the velocity and the pressure is about 1,100,000 psi-fpm (23540 kg/cm$^2$×m/min) or more. The polymeric bearing article comprises a polymer composition comprising at least one polymer having a glass transition temperature of at least about 140° C. and at least one friction and wear additive.

In a further aspect of the present invention, a powertrain component comprising a polymeric bearing article is provided. The polymeric bearing article comprises a polymer composition comprising at least one polymer having a glass transition temperature of at least about 140° C. and at least one friction and wear additive. The powertrain component is configured to subject the polymeric bearing article to a velocity and a pressure such that the product of the velocity and the pressure is about 1,100,000 psi-fpm (23540 kg/cm$^2$×m/min) or more.

In still another aspect, a system is provided which includes a powertrain component comprising a polymeric bearing article. The polymeric bearing article comprises a polymer composition comprising at least one polymer having a glass transition temperature of at least about 140° C. and at least one friction and wear additive. The powertrain component is configured to subject the polymeric bearing article to a velocity and a pressure such that the product of the velocity and the pressure is about 1,100,000 psi-fpm (23540 kg/cm$^2$×m/min) or more. The system, preferably, comprises a lubricant.

In yet other aspects, the present invention concerns a polymeric thrust bearing for an ultra-high PV environment comprising: an annular bearing body having an inner perimeter and an outer perimeter; a plurality of lubricant channels extending across the annular bearing body from the inner perimeter to the outer perimeter; wherein the annular bearing body comprises a polymer composition comprising at least one aromatic polyimide and/or at least one poly(aryl ether ketone) on one hand, and at least one friction and wear additive on the other hand; and wherein the polymeric thrust bearing is configured to withstand a velocity and a pressure in a lubricated environment in which the product of the velocity and the pressure is about 1,100,000 psi-fpm (23540 kg/cm$^2$×m/min) or more. It concerns also a method comprising: subjecting a polymeric bearing article to a velocity and a pressure such that the product of the velocity and the pressure is about 1,100,000 psi-fpm (23540 kg/cm$^2$×m/min) or more, wherein the polymeric bearing article comprises a polymer composition comprising at least one aromatic polyimide and/or at least one poly(aryl ether ketone) on one hand, and at least one friction and wear additive on the other hand. Finally, a last aspect of the present invention concerns a system comprising: a powertrain component comprising a polymeric bearing article, which bearing article comprises a polymer composition comprising at least one aromatic polyimide and/or at least one poly(aryl ether ketone) on one hand, and at least one friction and wear additive on the other hand, wherein the powertrain component is configured to subject the polymeric bearing article to a velocity and a pressure such that the product of the velocity and the pressure is about 1,100,000 psi-fpm (23540 kg/cm$^2$×m/min) or more.

These and other features of the present application will become apparent to one of ordinary skill in the art upon review of the following detailed description when taken in conjunction with the appended claims.

3 with a polymeric bearing article that was subjected to PV limit testing in a bath of automatic transmission fluid.

Figure 3:
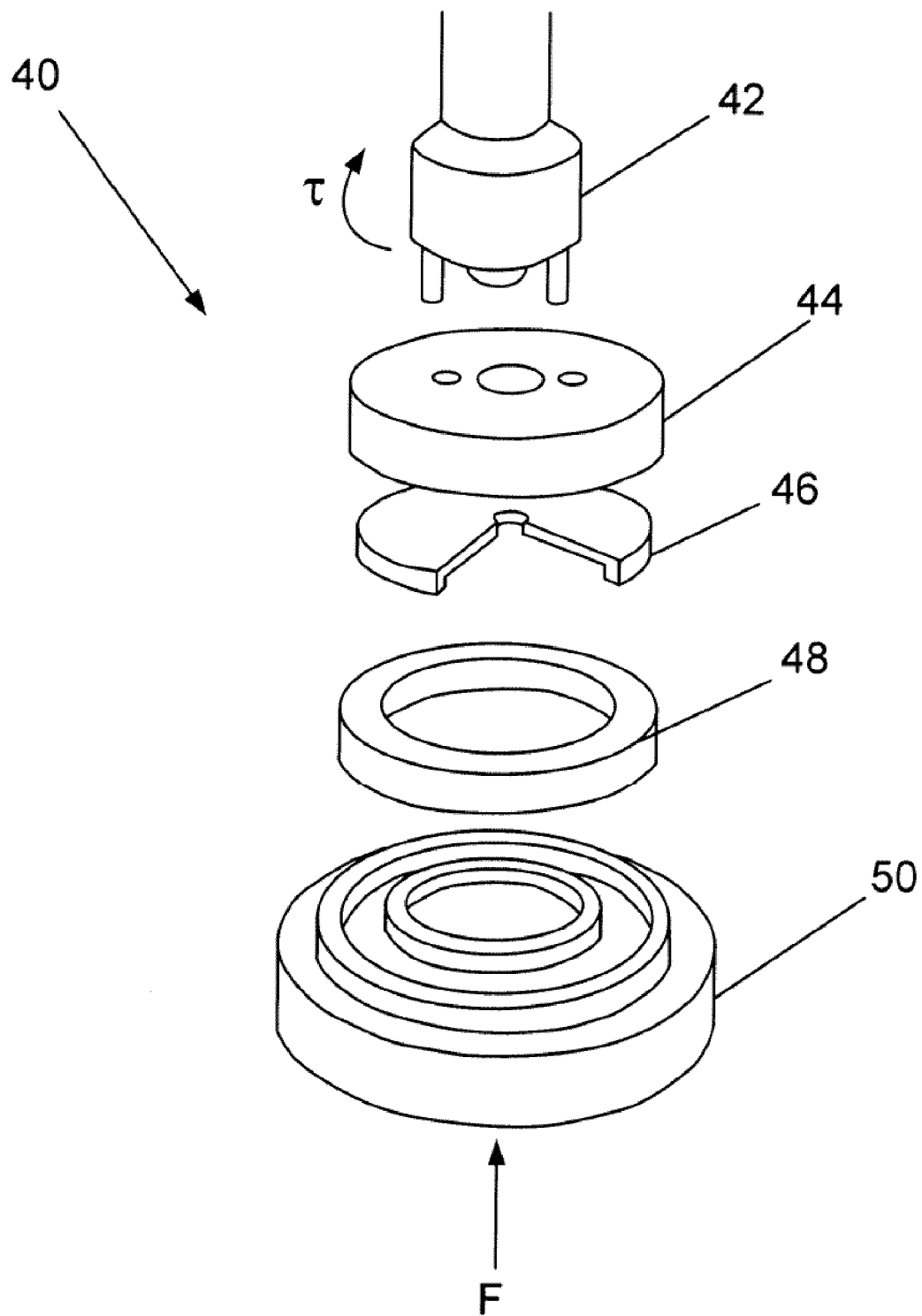
FIG. 3 is an exploded, perspective view of a test apparatus for testing the performance of a polymer composition for bearing applications.
Figure 6:
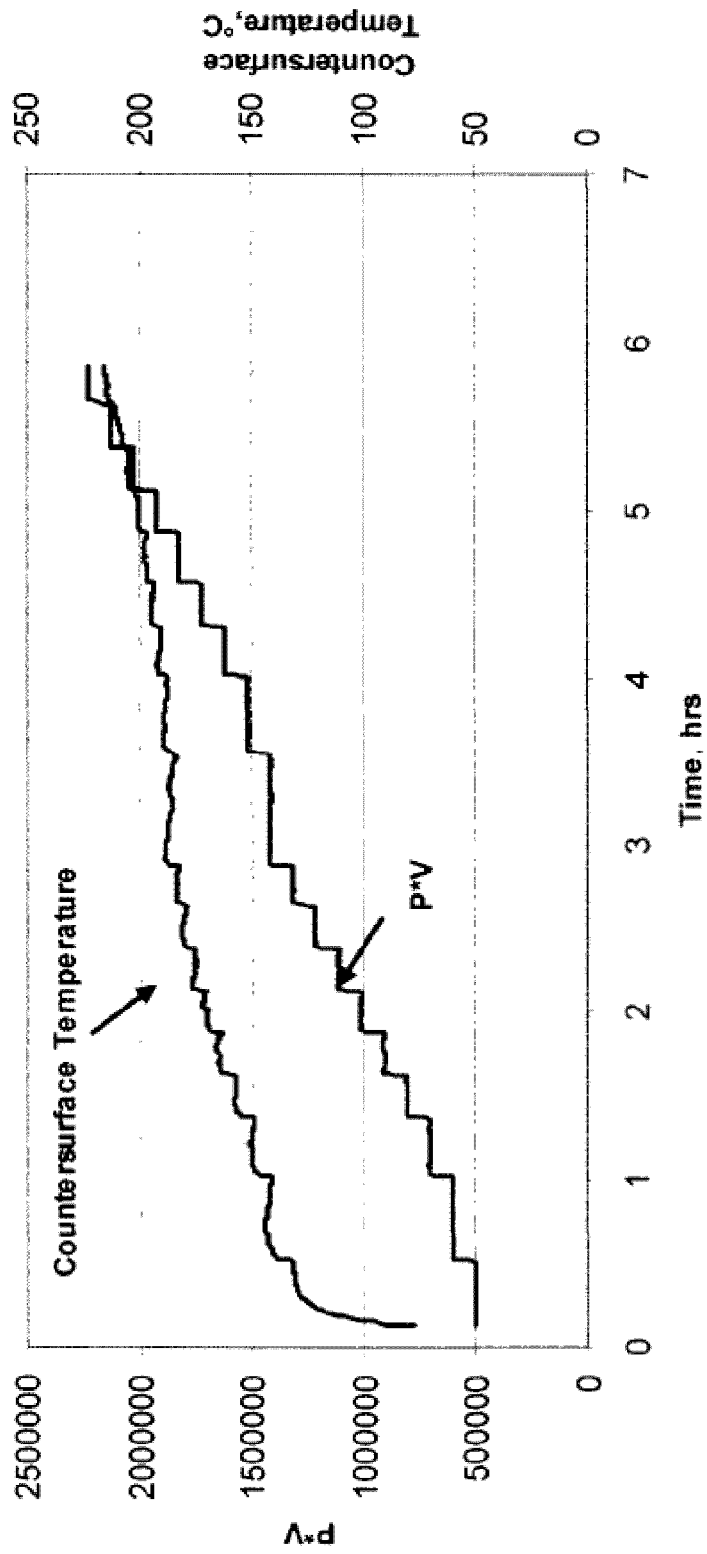

FIG. 6 is a graph, illustrating measured PV and specimen temperature for a test run using the test apparatus of FIG. 3 with a polymeric bearing article that was subjected to PV limit testing in a bath of automatic transmission fluid.

Figure 7:
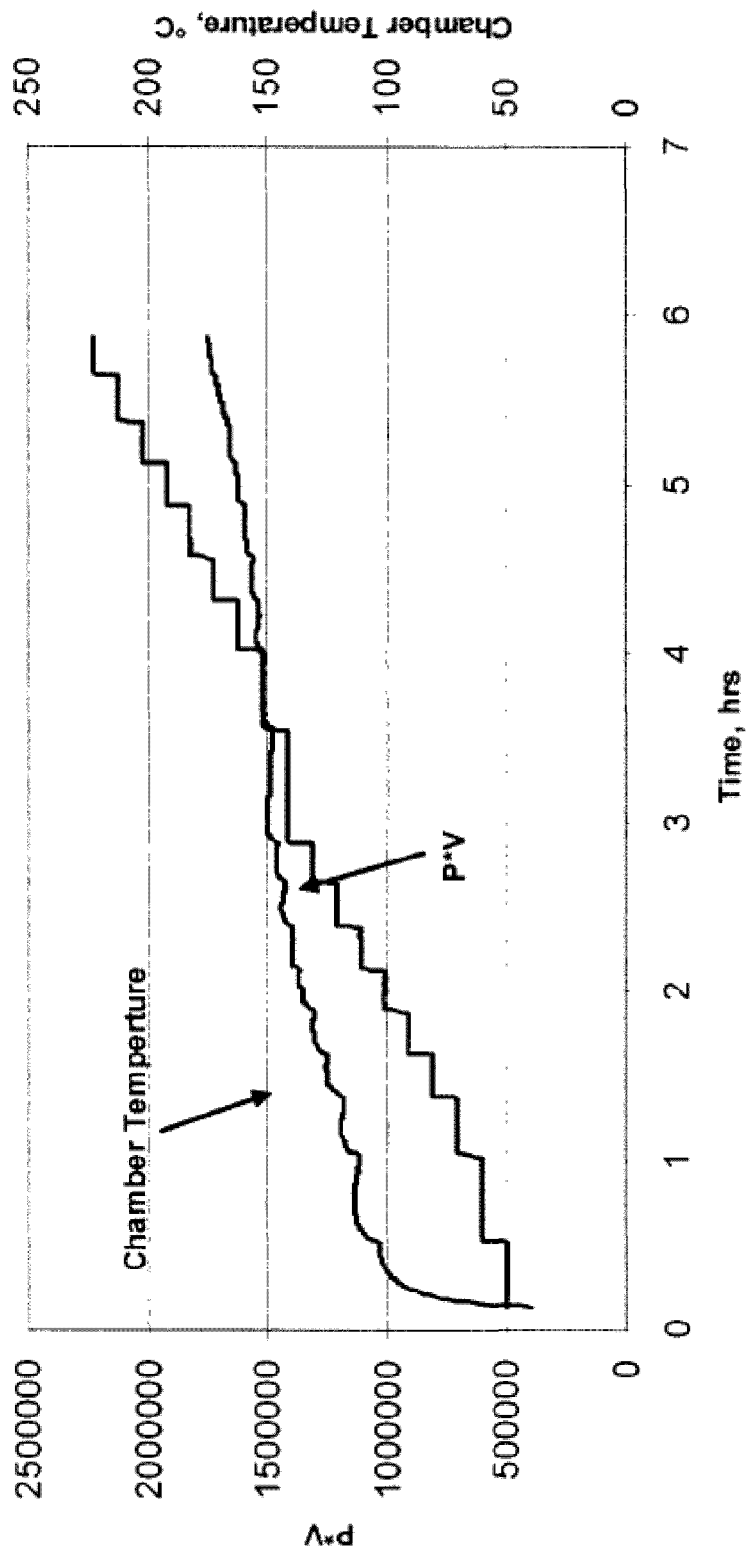

FIG. 7 is a graph, illustrating measured PV and chamber temperature for a test run using the test apparatus of FIG. 3 with a polymeric bearing article that was subjected to PV limit testing in a bath of automatic transmission fluid.

Figure 8:
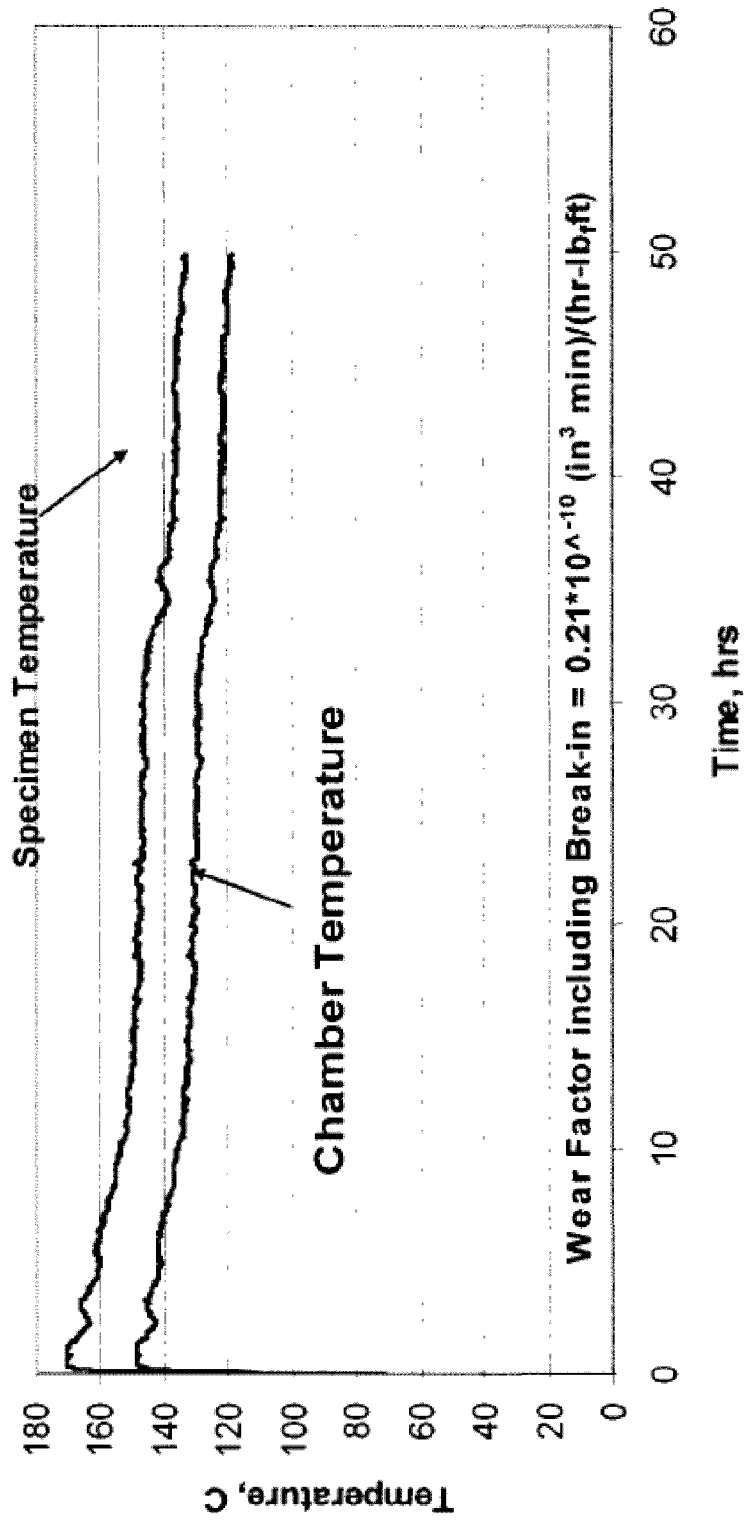

FIG. 8 is a graph, illustrating measured chamber temperature and specimen temperature for a test run using the test apparatus of FIG. 3 with a polymeric article that was subjected to an axial pressure of 787 psi (55.37 kg/cm$^2$) and a speed of 1550 fpm (472.44 m/min) in a bath of automatic transmission fluid for 50 hours.

Figure 9:
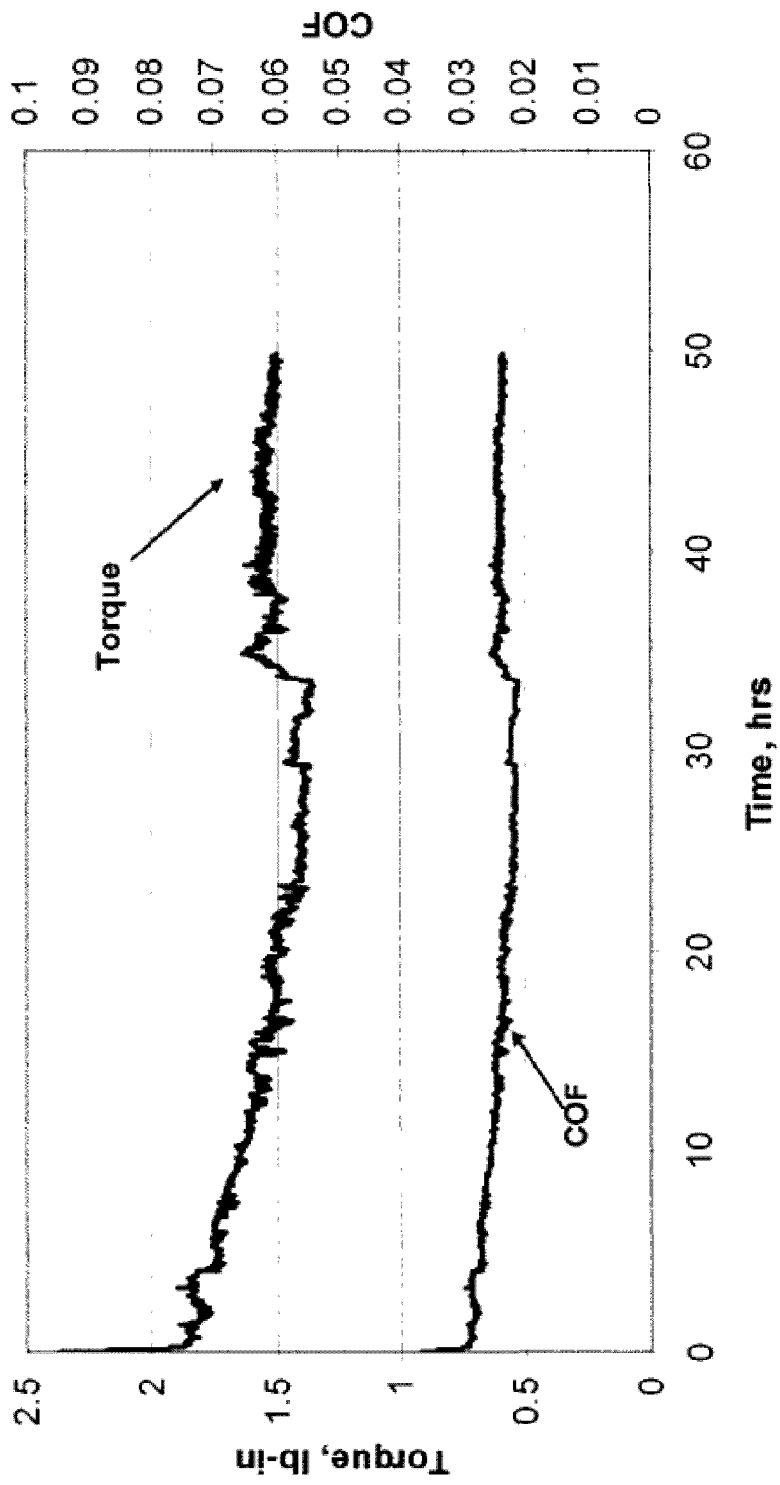

FIG. 9 is a graph, illustrating measured coefficient of friction and torque for a test run using the test apparatus of FIG. 3 with a polymeric article that was subjected to an axial pressure of 787 psi (55.37 kg/cm$^2$) and a speed of 1550 fpm (472.44 m/min) in a bath of automatic transmission fluid for 50 hours.

Figure 10:
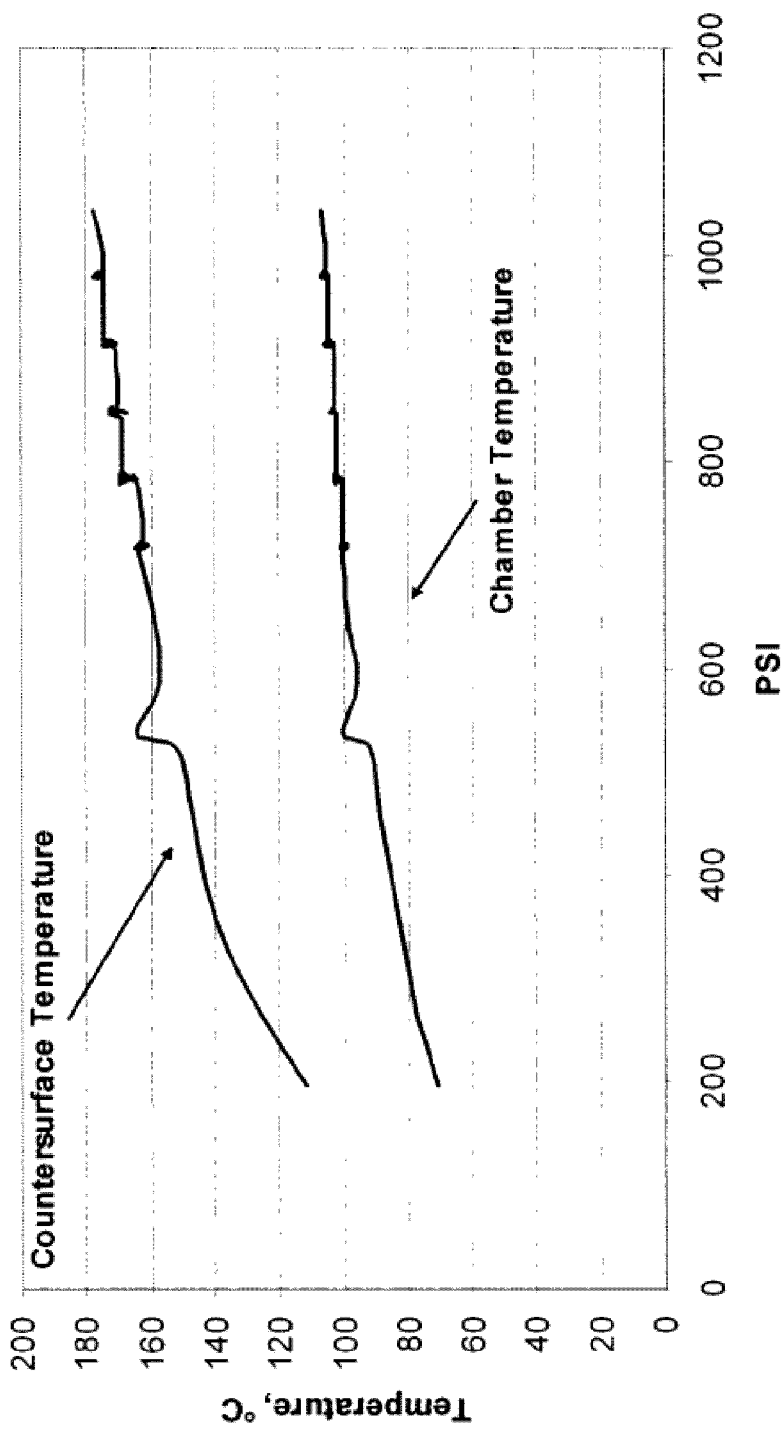

FIG. 10 is a graph, illustrating measured countersurface temperature and specimen temperature for a test run using the test apparatus of FIG. 3 with a polymeric article that was subjected to PV limit testing with recirculation of automatic transmission fluid.

Figure 11:
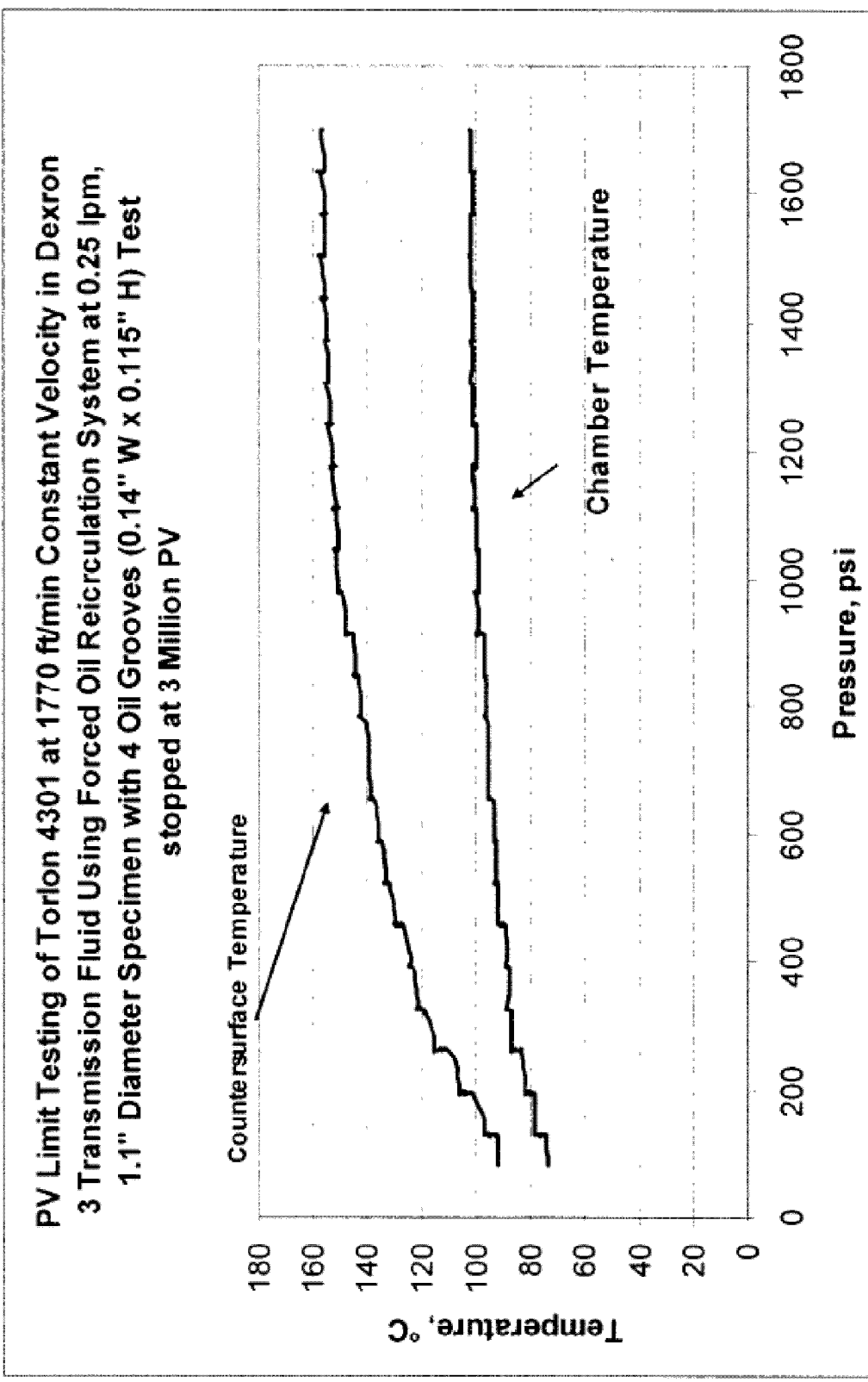

FIG. 11 is a graph, illustrating measured countersurface temperature and specimen temperature for a test run using the test apparatus of FIG. 3 with a polymeric article that was subjected to PV limit testing with recirculation of automatic transmission fluid.

Figure 12:
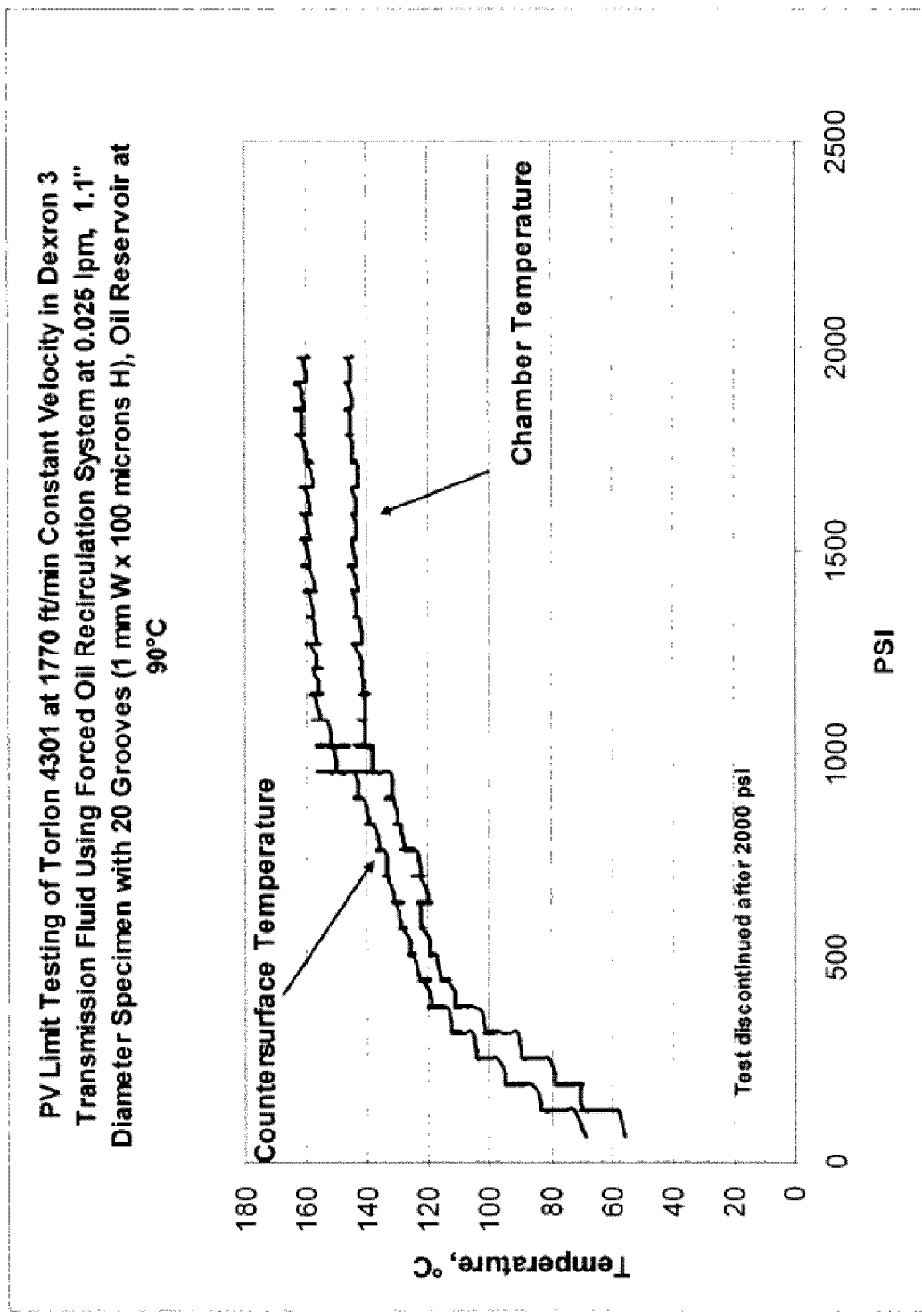

FIG. 12 is a graph, illustrating measured countersurface temperature and specimen temperature for a test run using the test apparatus of FIG. 3 with a polymeric article that was subjected to PV limit testing with recirculation of automatic transmission fluid.

Figure 13:
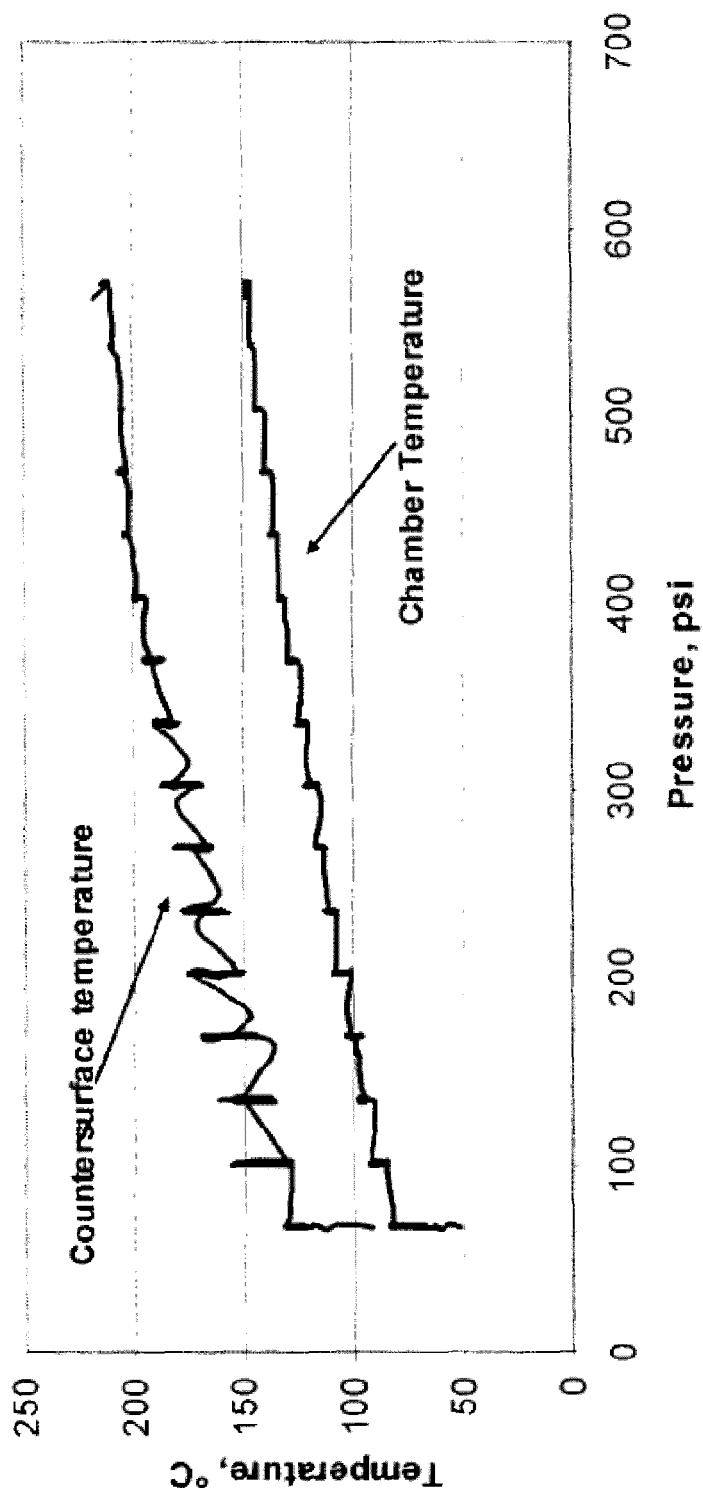

FIG. 13 is a graph, illustrating measured countersurface temperature and specimen temperature for a test run using the test apparatus of FIG. 3 with a polymeric article that was subjected to PV limit testing with recirculation of automatic transmission fluid.

Figure 14:
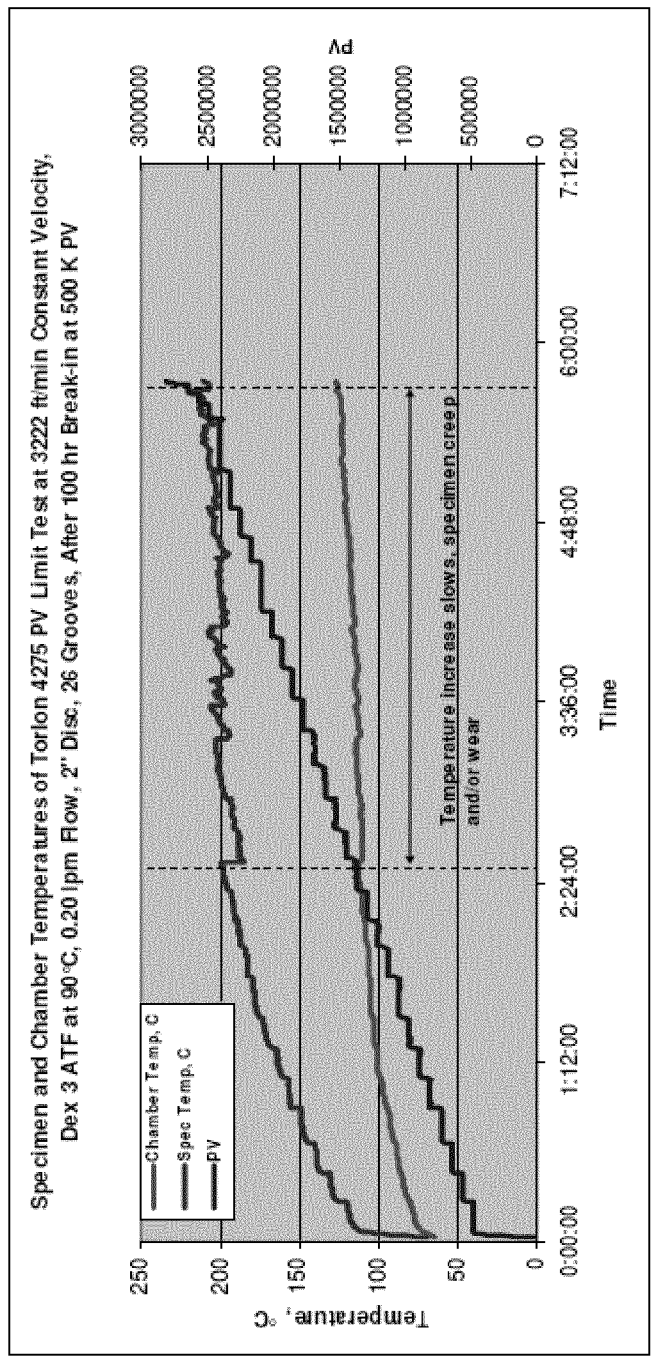

FIG. 14 is a graph, illustrating measured PV, specimen temperature and chamber temperature for a test run using the test apparatus of FIG. 3 with a polymeric bearing article that was subjected to PV limit testing with recirculation of automatic transmission fluid.

Figure 15:
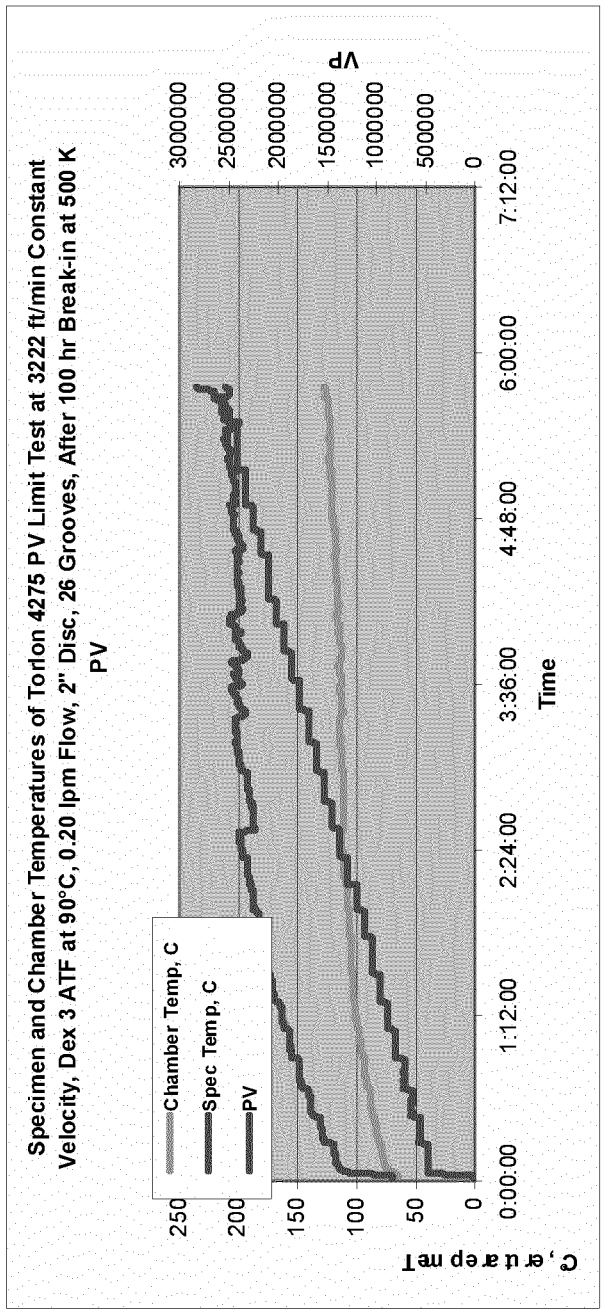

FIG. 15 is a graph, illustrating measured PV and coefficient of friction (COF) for a test run using the test apparatus of FIG. 3 with a polymeric bearing article that was subjected to PV limit testing with recirculation of automatic transmission fluid.

DETAILED DESCRIPTION

New polymeric bearings have been developed for use in ultra-high PV environments. The term "ultra-high PV" as used herein refers to environments or under conditions in which the bearing is exposed to a load and speed such that the product of the pressure of the load and the velocity equals or exceeds about 1,100,000 psi-fpm (pounds per square inch feet per minute) (23540 kg/cm$^2$×m/min). The ultra-high PV conditions may be encountered in many modern automotive transmissions and drivetrain systems. In certain embodiments, the polymeric bearings withstand the loads and speeds that are common in such environments while having suitable wear performance. New methods and systems employing such polymeric bearings also have been developed.

The load and velocity bearing capability of the polymer composition may be expressed as that combination of load and speed at which the coefficient of friction or the temperature of a bearing surface fails to stabilize. As used herein, the term "PV limit" will be used to denote the pressure-velocity relationship determined by the combination of load and speed at which the coefficient of friction or the temperature of a bearing surface fails to stabilize, expressed by the product of the unit pressure P (in psi or in (kg/cm$^2$×m/min)) based upon the projected bearing area and the linear velocity V (in fpm or in (m/min)). This increase in torque or temperature results in bearing failure and/or excessive wear. For a polymeric thrust bearing, the linear velocity is expressed as a mean average linear velocity, which in the case of a polymeric thrust bearing is a function of the angular velocity and the inner and outer diameter of the bearing.

For the purpose of the present invention, 1 psi corresponds to 0.0703 kg/cm$^2$, 1 fpm corresponds to 0.3048 m/min, 100 psi-fpm corresponds to 0.0214 (kg/cm$^2$×m/min), 1 inch (in) corresponds to 2.54 centimeter (cm), 0.0254 m or 25.4 mm. These conversions will be applied in the whole text and indicated in brackets.

As used herein, the term "wear" generally refers to the amount of the polymer composition removed from a bearing surface as a result of the relative motion of the bearing surface against a surface with which the bearing surface interacts. The wear of the polymer composition is generally reported as a "wear factor". As a relative measure of the performance of polymer compositions under the same operating conditions, wear factors have proven to be highly reliable. The wear factor is the wear rate (in/hr or (m/hr)) divided by the product of P and V. Polymeric bearing articles may exhibit a different wear rate and wear factor during their initial break-in period than during post break-in operations. Unless specifically provided otherwise, the wear factors described herein refer to the performance characteristics of the polymeric bearing articles after an initial break-in period.

Also, unless specifically provided otherwise, wear factors values are reported or referenced in the unit of (in$^3$ min)/(hr lb ft)*$10^{-10}$ or alternatively in (kg/cm$^2$×m/min)*$10^{-10}$.

A test apparatus 140 for analyzing the performance properties, such as the PV limit and, coefficient of friction, and wear factor, of polymeric bearing articles is illustrated in FIG. 3. The test apparatus 140 includes a rotary spindle 142 which supplies torque (τ) to a test specimen 146 via a rotary specimen holder 144. The test specimen 146 mates with a steel washer 148 contained within and held stationary by a stationary specimen holder 150. An axial load (F) is applied to the test specimen 146 via the stationary specimen holder 150. Because the surface area of the test specimen 146 contacting the steel washer 148, the rotational velocity of the test specimen 146, and force applied to the test specimen 146 are known, various performance properties of the polymer composition may be analyzed, including the coefficient of friction (COF), the wear factor (WF), and the PV limit of the polymer composition. For example, the test specimen 146 may be analyzed in accordance with various ASTM testing protocols, including ASTM D3702 and D3706. In some cases, the test apparatus 140 may include a lubricant bath for analyzing the performance properties of the test specimen 146 in a lubricated environment. For example, a reservoir may be provided around the test specimen 146 and the steel washer 148 and the reservoir may be at least partially filled with a lubricant, e.g., transmission oil. In certain cases, a forced recirculation system may be employed to evacuate lubricant from the reservoir and recirculate lubricant to the reservoir after the lubricant has been cooled.

As used herein, the term "torque" generally refers to a reaction of a tendency to turn due to friction forces between specimens traveling in a circular path. It is the product of a restraining force and the radius at which it acts to balance the frictional torque. The torque is reported or referenced in the unit of lb*in or N*m.

In a specific embodiment, the wear rate and coefficient of friction (COF) were determined following a test method, which is derived from the existing ASTM D3702 standard test method (ASTM D3702_94 (reapproved 2009), the whole contents is incorporated by reference herein). In the rest of the text, the expression "modified ASTM D3702 method" is understood, for the purpose of the invention, as the test method derived from the existing ASTM D3702 standard test method. In the following, only the differences with the ASTM D3702 standard test method are described.

In the modified ASTM D3702 method, the test machine, in particular a Multi-Specimen Falex® Test Machine, Computer Controlled Version (Serial No. Ser. No. 800635001766; Falex Corporation, Sugar Grove, Ill.), as described in ASTM D3702 and corresponding to the test apparatus of FIG. 3, operates with a test specimen 146 rotating under load against a stationary steel washer (e.g. stationary steel washer is 1018 steel with a 16±2 uin Ra surface roughness stationary) with a lubricant, in particular Valvoline Dexron III® automatic transmission fluid (Valvoline Oil Company). The load is applied by a pneumatic system instead of application of dead weights to the 10:1 lever arm. For the measurement of the torque ($\tau$), a 0-100 lb (kg) load cell is attached at the bottom of the specimen table. For each specific load, a torque ($\tau$) value is monitored by the test machine. Typically, the specimen thermocouple is positioned close to the counter surface (e.g. 1.5 mm from sample) without touching it.

The lubricant is supplied at a temperature of 90° C. by a Leeson Speed Master gear pump from a 2 gallon temperature-controlled reservoir. The lubricant flow rate is 0.2 L/min and is controlled by a Hedland flow meter with 0.1-0.75 L/min flow capability. The lubricant is delivered into the base of the specimen table and flows up and across the rotating test surface from the center of the specimen. The lubricant then drains out of the chamber through a hole in the bottom and re-circulates back to the oil reservoir by gravity. Each test consists of an initial break-in period for 25 hours, instead of 40 h, followed by a test duration of 25 h, which is repeated until a total of 100 hours test time is reached, each at the same selected load and velocity. After each test duration of 25 h, the thickness change of the test specimen is measured. Similar to the ASTM D3702 standard method, the conditioning of the test specimen for a minimum of 1 hr at room temperature prior to measuring of thickness is respected. The measurement of the thickness of the test specimen 146 is carried out at nine places instead of four places, as described in ASTM D3702. The test specimen 146 is marked at 9 places (e.g. lightly etched into the side of the test specimen 146) so that subsequent thickness measurements can be made at the same 9 places.

The test specimen 146 of the modified ASTM D3702 method and corresponding to a polymeric thrust bearing article of the present can be prepared according to known processing methods including injection molding, extrusion, blow molding, foam processing and the like. If desired the test specimen 146 can be optionally further cured. The specimen is further drilled with a center and off-set hole to fit into the large thrustwasher specimen holder of the test machine.

The test specimen 146 of the modified ASTM D3702 method, has an inner diameter of 1.869" (cm), an outer diameter of 2 inch (5.08 cm) and 26 radial grooves, as lubricant channels. Each radial groove has a width of 0.04 inch (1 mm) and a depth of 0.012 inch (300 microns). The contact area is 0.326 in$^2$ (cm$^2$) and the mean radius (r) is 0.967 in (2.456 cm$^2$). For the purpose of the present invention, the term "mean radius" refers to the average value of the inner and outer diameter of the test specimen 146.

For the purpose of the present invention, the wear rate, expressed in wear per hour (in/hr (m/hr)), is calculated from the eight thickness measurements on the test specimen 146, notably expressed in $X_{1a}, X_{1b}, X_{1c}, X_{1d}, X_{1e}, X_{1f}, X_{1g}, X_{1h}$ and $X_{1i}$, performed after the wear the 25 hr break-in (before the first test duration of 25 hr) and the nine thickness measurements on the test specimen 146, notably expressed $X_{2a}, X_{2b}, X_{2c}, X_{2d}, X_{2e}, X_{2f}, X_{2g}, X_{2h}$ and $X_{2i}$, performed after the first test duration (T) of 25 hr.

The wear rate is specifically calculated by the following calculation:

Wear Rate in m/hr(in./hr)=[($X_{1a}+X_{1b}+X_{1c}+X_{1d}+X_{1e}+X_{1f}+X_{1g}+X_{1h}+X_{1i}$)−($X_{2a}+X_{2b}+X_{2c}+X_{2d}+X_{2e}+X_{2f}+X_{2g}+X_{2h}+X_{2i}$)]/9*T wherein T=25 hr
X is thickness in inches (m)

The wear factor can accordingly be calculated from the wear rate as described above.

For the purpose of the present invention, the coefficient of friction is specifically calculated by the following calculation:

COF=torque($\tau$)/(mean radius*load)

wherein the torque ($\tau$) is measured as described above, the mean radius (r) is 0.967 in (2.456 cm$^2$).

Polymeric Thrust Bearings

Polymeric thrust bearings have been developed for use in ultra-high PV environments. For example, polymeric thrust bearings in accordance with one or more embodiments of the present invention may be employed in environments where the product of the pressure and the velocity equals or exceeds about 1,100,000 psi-fpm (23540 kg/cm$^2$×m/min).

In some embodiments, the polymeric thrust bearing is in the form of an annular bearing body having an inner perimeter and an outer perimeter. The annular bearing body may include a plurality of lubricant channels extending across the annular bearing body from the inner perimeter to the outer perimeter. The annular bearing body may be formed of a polymer composition comprising at least one polymer having a glass transition temperature of at least about 140° C. The polymeric thrust bearing, being formed of the polymer composition, may withstand a velocity and a pressure in a lubricated environment in which the product of the velocity and the pressure is at least about 1,100,000 psi-fpm (23540 kg/cm$^2$×m/min)

As used herein the term "lubricant" refers to a substance, such as a liquid, that may be disposed between two moving surfaces, one of which may include a surface of the thrust bearing, to reduce friction between the surfaces. In some embodiments, the lubricant may include an oil, such as a motor oil or a transmission oil. Such lubricants are well known in the art.

The annular bearing body of the invented polymeric thrust bearing comprises a polymer composition comprising at least one polymer having a glass transition temperature of at least about 140° C. and at least one friction and wear additive. The weight of the polymer composition, based on the weight of the annular bearing body, exceeds usually 10%, and is often above 50%, or even above 90%; in many embodiments, the annular bearing body consists of the polymer composition. The annular bearing body can either consist of one part, or it can consist of several parts. The annular bearing body can notably consist of several parts, wherein at least one of said parts, and possibly all of them, consist of the polymer composition; when at least one part of a multi-part annular bearing body consists of a material other than the polymer composition (e.g. metal or steel) [hereinafter, the other part], the weight of said other part, based on the weight of the annular bearing body, is usually less than 90%, and is often less than 50%, or even less than 10%. In accordance with the present invention, a certain preferred annular bearing body is a single part consisting of the polymer composition.

Figure 1:
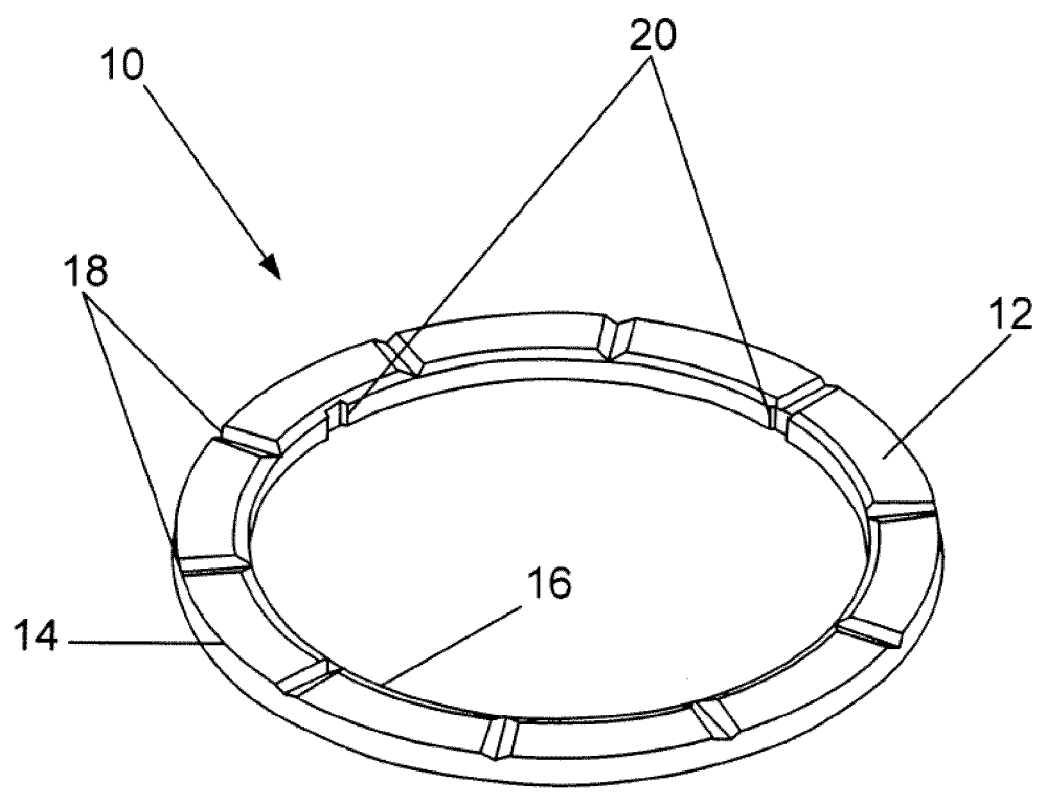
FIG. 1 is a perspective view of a polymeric thrust bearing in accordance with one or more embodiments of the present invention.

An exemplary polymeric thrust bearing 110 is illustrated in FIG. 1. The polymeric thrust bearing 110 may be generally annular in shape, having an outer perimeter 114 and an inner perimeter 116 for receiving a shaft. On at least one side, a mating surface 112 extends between the outer perimeter 114 and the inner perimeter 116. The mating surface 112 may include a plurality of lubricant channels 118. In the illustrated embodiment, the plurality of lubricant channels 118 are linear grooves that are oriented in a radial direction; however, other configurations may also be used. Moreover, the lubricant channels 118 may have various cross-sectional geometries, including, but not limited to, triangular, trapezoidal, and rounded. The polymeric thrust bearing 110 may also include one or more lubricant channels 120 along the inner perimeter 116. The lubricant channels 118 and 120 facilitate the flow of lubricant around the polymeric thrust bearing 110 when the polymeric thrust bearing 110 is situated on a shaft in a lubricated environment.

In some embodiments, the lubricant channels 118 occupy about 5% to about 25% of the surface area of the mating surface 112. In certain embodiments, the lubricant channels 118 occupy about 10% to about 20% of the surface area of the mating surface 112, or about 15% of the surface area of the mating surface. The lubricant channels 118 may provide hydrodynamic lift and cooling for the polymeric thrust bearing 110 when the polymeric thrust bearing 110 is used in a lubricated environment. In certain embodiments, the lubricant channels 118 have a depth of about 50 μm to about 1000 μm, about 250 μm to about 750 μm, or about 500 μm. In some embodiments, the polymeric thrust bearing 110 has a thickness perpendicular to the mating surface 112 of about 1 mm to about 3.5 mm, or about 1.5 mm to about 2 mm.

In an exemplary embodiment, the polymeric thrust bearing 110 is formed of a polymer composition that comprises a single polymer having a glass transition temperature of at least about 140° C. or a miscible blend of polymers, wherein each polymer of the miscible blend taken individually has a glass transition temperature of at least about 140° C., said single polymer or said miscible blend of polymers forming the matrix of the polymer composition, and one or more friction and wear additives that improve the performance properties of the polymer matrix, said friction and wear additives being dispersed in the polymer matrix.

In certain embodiments, the polymer composition comprises one and only one polymer having a glass transition temperature ($T_g$) of at least about 140° C. In certain other embodiments, the polymer composition comprises several polymers, each of them, when taken individually (i.e. uncombined), having a glass transition temperature ($T_g$) of at least about 140° C. In certain embodiments, the at least one polymer having a glass transition temperature ($T_g$) of at least about 140° C. has a $T_g$ of about 170° C. or more, about 200° C. or more, about 240° C. or more, or about 270° C. or more.

Thus, for example, an exemplary polymer composition comprises one and only one polymer having a glass transition temperature ($T_g$) of at least about 240° C.; other exemplary polymer compositions comprise two, three or even more polymers, each of them, when taken individually, having a glass transition temperature ($T_g$) of at least about 170° C.

It is well known that the particular value of $T_g$ that may be obtained for a particular polymer is dependent on the specific method used to determine $T_g$. For purposes herein, glass transition temperature is determined by differential scanning calorimetry (DSC) using the method described herein. Specifically, DSC analyses are to be performed in accordance to ISO 13357-2 (Determination of glass transition temperature) and ASTM D-3418 (Standard Test Method for Transition Temperatures and Enthalpies of Fusion and Crystallization of Polymers by Differential Scanning calorimetry) using the particular parameters set forth below.

The DSC measurement may be performed using a Q1000 or Q20 DSC from TA Instruments using Thermal Advantage version 5.1.2. The carrier gas is nitrogen with 99.998% purity at a flow rate of 50 ml/min. Auxiliary equipment (e.g., cooling unit and flow meters) may be used according to standard procedures. Polymer samples to be analyzed are in the form of powder, pellet, or granules. If needed, a hand cutter can be used to cut the sample forms such as a pellet into small pieces. A 10 mg sample is weighed into an aluminum DSC pan, and the DSC pan is sealed with an aluminum lid using the appropriate crimper.

The sample is placed in the DSC instrument, and then heated in accordance with the following protocol: (1) ramp temperature from 30° C. to 450° C. at a heating rate of 20° C./min, (2) hold isothermally at 450° C. for 1 minute, (3) ramp temperature from 450° C. to 30° C. at a cooling rate of 20° C./min, (4) hold isothermally at 30° C. for 1 minute, and (5) ramp temperature from 30° C. to 450° C. at a heating rate of 20° C./min. Glass transition temperature is determined from the data produced during the second heating ramp. For the DSC experiments, $T_g$ is determined via midpoint analysis with the midpoint temperature defined as the point at which the curve is intersected by a line that is equidistant between the two extrapolated baselines. When no $T_g$ is apparent by DSC, then Dynamic Mechanical Analysis (DMA) is used.

The DMA measurement may be performed using an ARES RDA3, from TA Instruments using Orchestrator Software version V7.2.0.2. The oven gas purge is nitrogen with 99.998% purity at a flow setting of 40 psi (with the oven on). Typical settings for the motor air and RSA-III motor transducer air are 60 psi and 60 psi, respectively. Auxiliary equipment (e.g., cooling unit and flow meters) may be used according to standard procedures.

The test specimen is rectangular in shape with the following range of geometries: length of sample (Ls)=50 mm, width (W)=10-12 mm, and thickness (T)=3-4 mm. Standard test samples are prepared from injection molding process with standard molds for ASTM or ISO tensile or flexural bars. These molded specimens may be cut to appropriate dimensions using a Buehler ISOMET low speed saw. Prior to testing, all samples are annealed for longer than 1 hour in an air circulated oven under specified temperature conditions dependent upon the polymer composition.

The DMA experiments are performed in the Torsion Mode for Rectangular Geometries with strain control. The gap lengths are set to the appropriate test length desired (L=30-35 mm) The width and thickness of the test specimen are measured to the nearest 0.01 mm and the measurements are recorded. The test specimen is clamped in between the upper (movable) and lower (stationary) test fixtures. A torque driver with a limit set-point of 70 cN·m may be used during this process. A strain % of 0.05% and a test frequency of 10 rad/sec is utilized for all experiments. All tests are conducted over a temperature range from 30° C. to 450° C. with a dynamic heating rate of 5° C./min. Thermo-mechanical spectra of storage modulus (G'), loss modulus (G"), and tan-delta (G"/G') as a function of temperature is collected for the test conditions described. $T_g$ is then determined and reported as the temperature corresponding to the maximum value in the Tan Delta peak.

In some embodiments, the polymeric thrust bearing 110 comprises a polymer composition that has a coefficient of friction (COF) of about 0.04 or less in a lubricated system. In certain embodiments, the polymeric thrust bearing 110 comprises a polymer composition that has a COF in a lubricated system of about 0.03 or less, 0.02 or less, or 0.01 or less. In some embodiments, the polymeric thrust bearing 110 advantageously has a PV limit of about 1,100,000 psi-fpm (23540 kg/cm$^2$×m/min) or more. In certain embodiments, the polymeric thrust bearing 110 preferably has a PV limit of about 1,500,000 psi-fpm (32,100 kg/cm$^2$×m/min) or more, more preferably about 1,750,000 psi-fpm (37450 kg/cm2×m/min) or more, even more preferably about 2,000,000 psi-fpm (42,800 kg/cm$^2$×m/min) or more, most preferably about 2,500,000 psi-fpm (53,500 kg/cm$^2$×m/min) or more, or even possible about 3,000,000 psi-fpm (64,200 kg/cm$^2$×m/min) or more. In some embodiments, the polymeric thrust bearing 110 has a wear factor (WF) of about 0.2 or less. In certain embodiments, the polymeric thrust bearing 110 has a WF of about 0.1 or less, 0.05 or less, or 0.01 or less. In a preferred embodiment, the polymeric thrust bearing 110 has a WF of about 1.0 or less, 0.80 or less, 0.60 or less, 0.50 or less, 0.20 or less, 0.10 or less, 0.08 or less, 0.05 or less, or 0.01 or less.

It is understood that the coefficient of friction (COF) and Wear Factor (WF) are measured according to the modified ASTM D3702 method, as described above.

The at least one polymer having a glass transition temperature of at least about 140° C. may be an aromatic polyimide, such as a polyamide-imide (PAI) or a polyetherimide; or a polybenzimidazole (PBI); or a poly(aryl ether ketone) (PAEK) polymer, such as a poly(ether ether ketone) (PEEK) polymer, a sulfonated PEEK or a sulfamidated poly(ether ether ketone). Exemplary aromatic polyimides include VESPEL® non-melt-processible polyetherimide by E. I. du Pont de Nemours and Company and AURUM® melt-processible polyetherimide by Mitsui Chemicals, Inc, TORLON® melt-processible aromatic polyamide-imide by Solvay Advanced Polymers, LLC. An exemplary poly(aryl ether ketone) is KETASPIRE® PEEK polymer by Solvay Advanced Polymers, LLC.

The polymer composition may comprise a polymer combination that includes any one or more of the foregoing or herein-described polymers. The polymer combination may be a miscible blend, a partially miscible blend or an immiscible blend. For example, the polymer composition may comprise a blend of a polyamide-imide such as TORLON® 4000T PAI with a sulfonated poly(ether ether ketone), a sulfamidated poly(ether ether ketone), MATRIMID® 5218 polyimide, or polybenzimidazole (PBI). Alternatively, the polymer composition may comprise an immiscible blend of a poly(ether ether ketone) and a polyamide-imide such as TORLON® 4000T PAI. Other polymeric blends are also possible.

The weight of the at least one polymer having a glass transition temperature of at least about 140° C., based on the total weight of the polymer composition, is generally of at least about 25%, and preferably of at least about 50%. In certain embodiments, it is of at least about 60%, at least about 70%, at least about 80% or at least about 90%. In certain other embodiments, it ranges from about 50% to about 99%, from about 60% to about 98%, from about 70% to about 97%, from about 80% to about 96%, or from about 90% to about 95%, based on the total weight of the polymer composition.

Various friction and wear additives may be incorporated into the polymer composition. According to the present invention, a "friction and wear additive" is intended to denote a component of the polymer composition that provides the resultant polymer composition with a decreased coefficient of friction as compared to a comparable polymer composition not including the friction reducing component. Thus, the friction reducing additive causes the resultant polymer composition and articles comprising said polymer composition to have a more slippery or silky or slick feel, with reduced friction between the polymer composition (or articles comprising said polymer composition) and materials that come into contact with the polymer composition.

The weight of the one or more friction and wear additives, based on the total weight of the polymer composition, is generally of at least about 0.5% and is preferably of at least about 1%. It may be of at least about 2%, at least about 5%, at least about 10% or at least about 20%; besides, it may be of at most about 50%, at most about 40%, at most about 30%, at most about 20%, at most 10%, or at most about 5%, based on the total weight of the polymer composition. In still certain other embodiments, it ranges from about 1% to about 50%, from about 2% to about 40%, from about 3% to about 30%, from about 4% to about 20% or from about 5% to about 10%, based on the total weight of the polymer composition.

The friction reducing additive is preferably selected from the group consisting of fluoropolymers such as poly(tetrafluoro ethylene), carbon fibers, inorganic fibers, polymeric fibers, graphite, silicone oils, siloxane polymers, molybdenum disulfide, boron nitride, silicon carbide, silica, silicon nitride, zirconium oxide, aluminum oxide, and mixtures thereof. It is more preferably selected from the group consisting of fluoropolymers, carbon fibers, polymeric fibers, graphite, molybdenum disulfide, and mixtures thereof.

Fluoropolymers suitable for use in the practice of this invention may be any of the fluoropolymers known in the art for use as lubricants, and preferably will be a polytetrafluoroethylene (PTFE). PTFE resins are widely known for chemical resistance and for lubricity and toughness, and PTFE powders have long been used to improve the lubricity of a wide variety of materials. PTFE spheres or beads may be incorporated in molding resin formulations to act as an internal lubricant and to create a smooth, slippery surface with enhanced friction and wear properties. Suitable fluoropolymer resins are readily available commercially from a variety of sources, including Zonyl® fluoroadditives from DuPont Company, Daikin-Polyflon™ PTFE from Daikin America Inc, Polymist® PTFE from Solvay Solexis, and Polylube PA 5956 from Dyneon.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof.

Carbon fibers suitable for use in the practice of this invention include highly graphitized carbon fiber having a high thermal conductivity and a low or negative coefficient of thermal expansion produced from pitch. Exemplary carbon fibers include pitch-based carbon fiber and generally will have a thermal conductivity of about 140 W/mK or greater. Preferably, the carbon fiber will have a thermal conductivity greater than about 300 W/mK. In certain embodiments of the instant invention, the carbon fiber will have a thermal conductivity greater than about 600 W/mK. Other embodiments will use carbon fiber with a thermal conductivity greater than 900 W/mK, and greater than 1000 W/mK. Fiber with even greater thermal conductivity, from 1300 W/mK up to the thermal conductivity of single crystal graphite, 1800 W/mK and higher, will also be suitable.

Graphitized pitch-based carbon fibers are readily available from commercial sources containing at least about 50 weight percent graphitic carbon, greater than about 75 weight percent graphitic carbon, and up to substantially 100% graphitic carbon. Highly graphitic carbon fiber particularly suitable for use in the practice of this invention may be further characterized as highly conductive, and such fiber is generally used having a modulus of about 80 to about 120 million pounds per square inch, i.e., million lbs/in² (MSI). In certain embodiments the highly graphitic carbon fiber has a modulus of about 85 to about 120 MSI, and in other certain embodiments about 100 to about 115 MSI.

In certain embodiments, the article having a bearing surface comprises a mixture of at least two friction and wear additives. The mixture of at least two friction reducing additives may be composed of at least one friction reducing additive chosen from particulate solid type friction reducing additives, such as graphite and of at least one other friction reducing additive chosen from lubricious reinforcing fibers and/or PTFE.

In some embodiments, the polymer composition, in particular the polymeric thrust bearing 110, includes PTFE, graphite, and, optionally, molybdenum disulfide (MoS₂) incorporated into or onto the polymeric matrix material. In certain embodiments, the PTFE may be present in a concentration of about 1% to about 20%, or preferably of about 2% to about 10%, based on the total weight of the polymer composition. In certain embodiments, the graphite may be present in a concentration of about 1% to about 55%, or preferably about 2% to about 20%, based on the total weight of the polymer composition. In some embodiments, the polymer composition, in particular the polymeric thrust bearing 110, may comprise carbon fiber. In certain embodiments, the carbon fiber may be present in a concentration of about 1% to about 40%, based on the total weight of the polymer composition.

Optionally, one or more ingredients other than polymers having a glass transition temperature of at least about 140° C. and friction and wear additives, may be incorporated in the polymer composition. These ingredients may be polymeric or not in nature.

Thus, for example, reinforcing or filling additives, may be incorporated into the polymeric composition to improve certain of properties of the polymer composition, notably: short term mechanical capabilities (i.e. mechanical strength, toughness, hardness, stiffness), thermal conductivity, creep strength and fracture resistance, high temperature dimensional stability, fatigue resistance and co. Additives other than friction and wear additives may include glass fibers; asbestos fibers; boron fibers (e.g. obtained by deposition of boron microgranules on a tungsten or carbonate yarn), metal fibers; ceramic fibers like silicon nitride Si₃N₄; talc-glass fibers; calcium silicate fibers like wollastonite micro-fibers; silicon carbide fibers; metal borides fibers (e.g. TiB₂) and mixtures thereof. Pigments, such as titanium dioxide and/or ultramarine blue, may also be incorporated into the polymeric composition.

In a particular embodiment in accordance with the present invention, the polymer composition further comprises one or more polymers having a glass transition temperature substantially below 140° C., e.g. below 135° C. or even below 100° C., such as a polyphenylene sulfide ($T_g$ typically of about 88° C.) or a polyphthalamide ($T_g$ ranging typically from about 85° C. to about 130° C.). Adding one or more polymers having a glass transition temperature substantially below 140° C. to the polymer composition may be useful in certain instances, especially for the purpose of optimizing the balance cost-properties of the polymer composition as a function of the technical requirements to be met by the polymeric thrust bearing. Indeed, based on the Applicant's expertise, certain polymers having a glass transition temperature substantially below 140° C., such as polyphenylene sulfides and polyphthalamides, which are generally substantially more cost-attractive than polymers having a glass transition temperature of at least about 140° C. are, can be incorporated in the polymer composition without substantially compromising the high level of friction and wear resistance provided by the polymer having a glass transition temperature of at least about 140° C. The weight of the at least one polymer having a glass transition temperature of substantially below 140° C., based on the weight of the at least one polymer having a glass transition temperature of at least about 140° C., is advantageously of at most 1.0, preferably of at most 0.75, still more preferably of at most 0.5 and the most preferably of at most 0.2; it can be of at least 0.01, at least 0.02, at least 0.05, at least 0.1, at least 0.2 or at least 0.5. Also, in accordance with the present particular embodiment, the combined weight of the at least one polymer having a glass transition temperature of at least about 140° C. and of the at least one polymer having a glass transition temperature of substantially below 140° C., based on the total weight of the polymer composition, can range from about 50% to about 99%, from about 60% to about 98%, from about 70% to about 97%, from about 80% to about 96%, or from about 90% to about 95%.

In some embodiments, the polymer composition, in particular the polymeric thrust bearing 110 (or other bearing article), may comprise a poly(aryl ether ketone) polymer. The term "poly(aryl ether ketone)" (PAEK) as used herein includes any polymer of which more than 50 wt. % of the recurring units are recurring units (R1) of one or more formulae containing at least one arylene group, at least one ether group (—O—) and at least one ketone group [—C(=O)—].

Recurring units (R1) include generally at least one —Ar—CO—Ar— moiety, in particular at least one

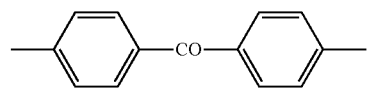

moiety, and can be notably chosen from:

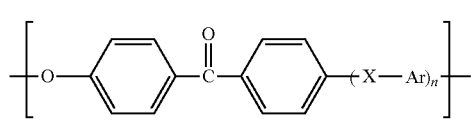
(1)
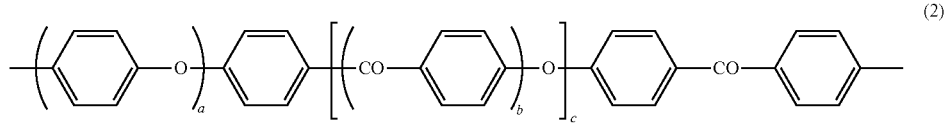
(2)
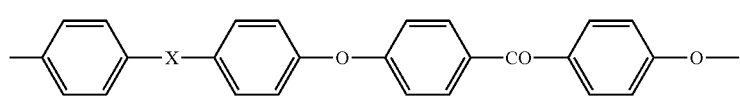
(3)
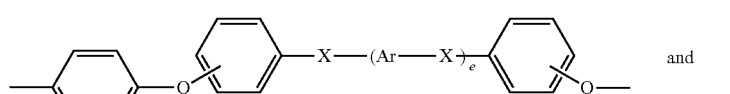
and
(4)
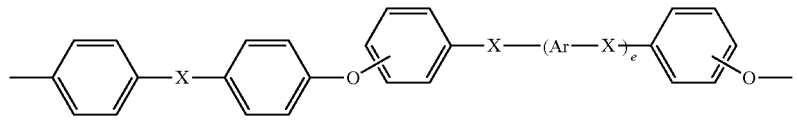
(5)
and mixtures thereof, wherein:
Ar is independently a divalent aromatic radical selected from phenylene, biphenylene or naphthylene,
X is independently O, C(=O) or a direct bond,
n is an integer of from 0 to 3,
b, c, d and e are 0 or 1,
a is an integer of 1 to 4, and
preferably, d is 0 when b is 1.
More preferably, recurring units (R1) are chosen from:
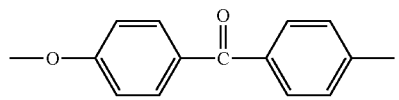
(6)
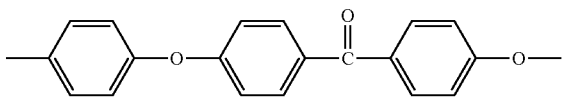
(7)
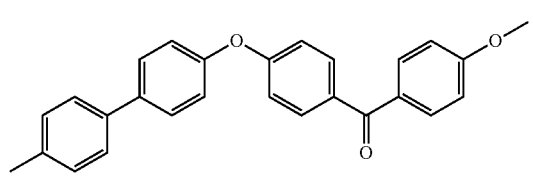
(8)
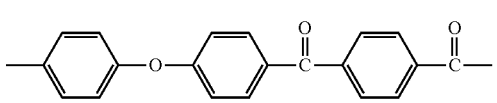
(9)
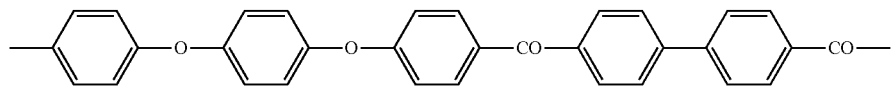
(10)
(11)
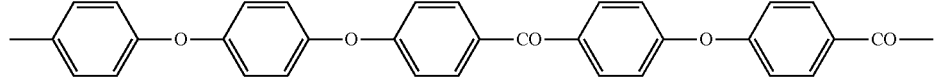
(12)
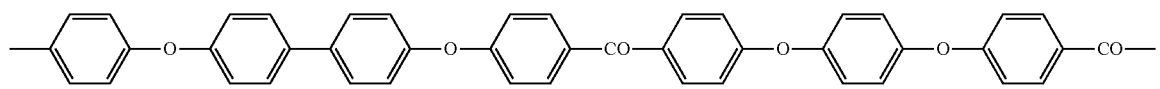
(13)
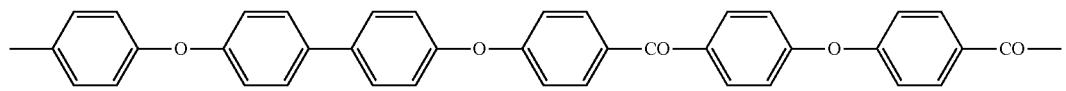
(14)

-continued
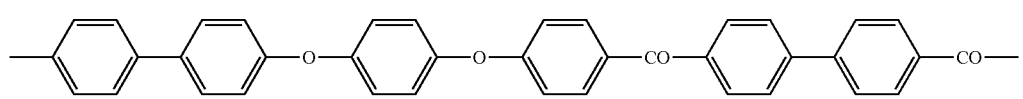 (15)
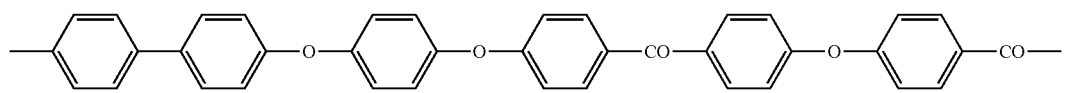 (16)
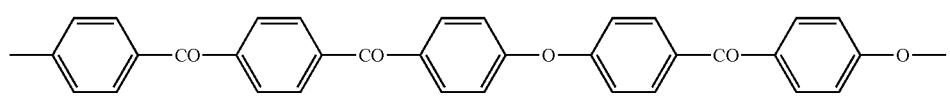 (17)
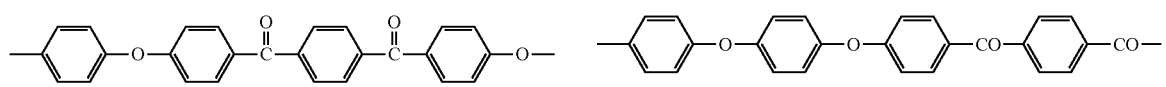 (18)
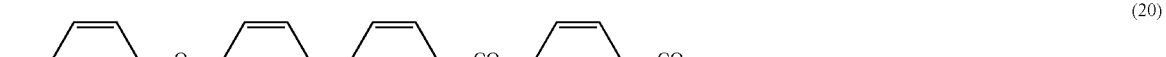 (19)
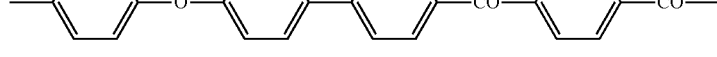 (20)
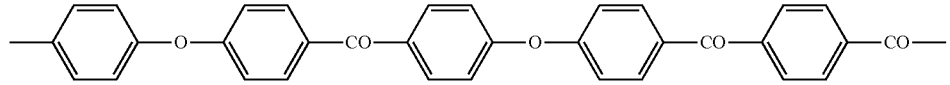 (21)
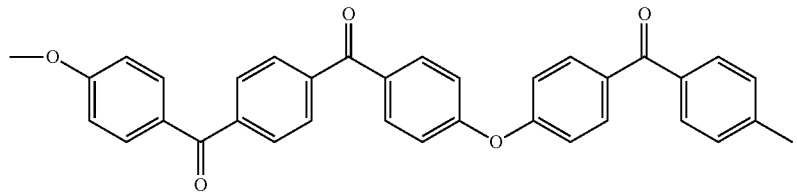 (22)
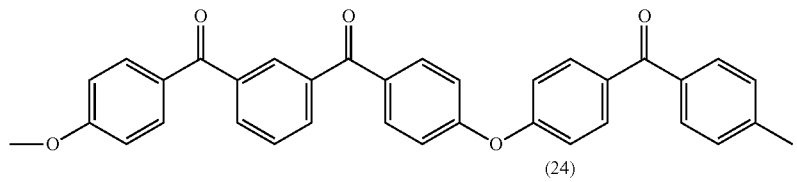 (23)
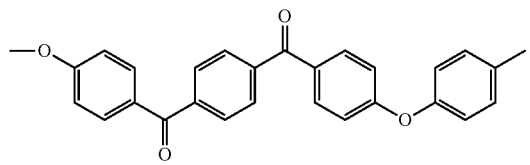 (24)
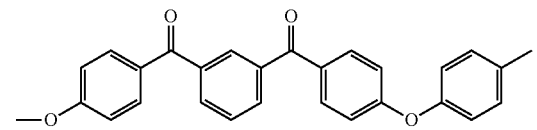 (25)
and mixtures thereof.
Still more preferably, recurring (R1) are chosen from:
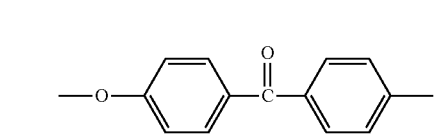 (6)
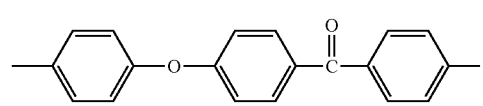 (7)
and
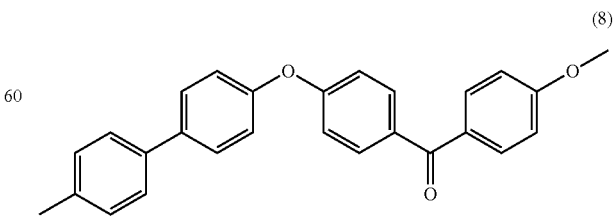 (8)
and mixtures thereof.

Most preferably, recurring units (R1) are:

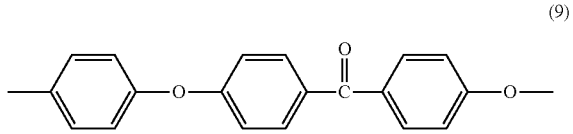

(9)

A poly(ether ether ketone) (PEEK) polymer is intended to denote any polymer of which more than 50 wt. % of the recurring units are recurring units (R1) of formula (7). A PEK polymer is intended to denote any polymer of which more than 50 wt. % of the recurring units are recurring units (R1) of formula (6).

A PEEK homopolymer is intended to denote any polymer of which essentially all (if not, all) the recurring units are recurring units (R1) of formula (7). A PEK homopolymer is intended to denote any polymer of essentially all (if not, all) the recurring units are recurring units (R1) of formula (6).

The poly(aryl ether ketone) may be notably a homopolymer, a random, alternate or block copolymer. When the poly(aryl ether ketone) is a copolymer, it may notably contain (i) recurring units (R1) of at least two different formulae chosen from formulae (6) to (25), or (ii) recurring units (R1) of one or more formulae (6) to (25) and recurring units (R1*) different from recurring units (R1).

Preferably more than 70 wt. %, more preferably more than 85 wt. % of the recurring units of the poly(aryl ether ketone) are recurring units (R1). Still more preferably, essentially all the recurring units of the poly(aryl ether ketone) are recurring units (R1). Most preferably, essentially all, or even all, the recurring units of the poly(aryl ether ketone) are recurring units (R1).

The polyetheretherketone (P1) can have a reduced viscosity (RV) of at least 0.60 dl/g, at least 0.65 dl/g or at least 0.70 dl/g, as measured in 95-98% sulfuric acid (d=1.84 g/ml) at a polyetheretherketone concentration of 1 g/100 ml. The measurement is performed using a No 50 Cannon-Fleske viscometer; RV is measured at 25° C. in a time less than 4 hours after dissolution. Besides, the RV of the polyetheretherketone (P1) can be notably of at most 1.20 dl/g or of at most 1.10 dl/g. The polyetheretherketone (P1) can also have a RV of from 0.70 to 0.90 dl/g, or of from 0.90 to 1.10 dl/g.

The polyetheretherketone (P1) has a melt viscosity of advantageously at least 0.12 kPa·s, preferably at least 0.25 kPa·s, more preferably at least 0.32 kPa·s, still more preferably at least 0.38 kPa·s at 400° C. and a shear rate of 1000 s$^{-1}$, as measured using a capillary rheometer in accordance with ASTM D3835. As capillary rheometer, a Kayeness Galaxy V Rheometer (Model 8052 DM) can be used. Besides, the polyetheretherketone (P1) has a melt viscosity of advantageously at most 1.00 kPa·s, preferably at most 0.50 kPa·s, more preferably at most 0.44 kPa·s at 400° C. and a shear rate of 1000 s$^{-1}$, as measured using a capillary rheometer in accordance with ASTM D3835.

One process well known in the art to produce the poly(aryl ether ketone) (P1), in particular the polyetheretherketone (P1), comprises the step of reacting a usually substantially equimolar mixture of at least one bisphenol with at least one dihalobenzoid compound, and/or at least one halophenol compound (nucleophilic polycondensation reaction). A preferred bisphenol in such a process is p-hydroquinone; a preferred dihalobenzoid compound in such a process is 4,4'-difluorobenzophenone; a preferred halophenol compound in such a process is 4-(4-fluorobenzoyl)phenol. Another process well known in the art to produce the polyetheretherketone (P1) comprises the step of electrophilically polymerizing phenoxyphenoxybenzoic acid or the like, using an alkane sulfonic acid as solvent and in the presence of a condensing agent. Polyetheretherketones are commercially available notably from Solvay Advanced Polymers, L.L.C. as KETASPIRE® PEEK.

In some embodiments, the polymer composition, in particular the polymeric thrust bearing 110 (or other bearing article), may comprise an aromatic polyimide polymer. The aromatic polyimide (P2) according to the present invention is any polymer of which more than 50 wt. % of the recurring units (R1) comprise at least one aromatic ring and least one imide group. The aromatic polyimide (P2) may be classified, for example, as an aromatic polyamide imide, or as a polyether imide.

The imide groups contained in the recurring units (R1) can be imide groups as such [formula (26)] and/or in their amic acid form [formula (27)]:

(26)

(27)

The imide groups, as such and/or in their corresponding amic acid form, are advantageously linked to an aromatic ring, as illustrated below:

(28)

(29)

whereas Ar' denotes a moiety containing at least one aromatic ring.

The imide groups are advantageously present as condensed aromatic system, yielding a five- or six-membered heteroaromatic ring, such as, for instance, with benzene [phthalimide-type structure, formula (30)] and naphthalene [naphthalimide-type structure, formula (31)].

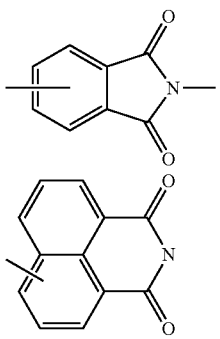

In a first particular embodiment, the recurring units (R1) of the aromatic polyimide (P2) have no ether groups, and no amide groups other than those possibly included in the amic acid form of the imide groups [recurring units (R1a)].

Recurring units (R1a) are preferably chosen from recurring units of formulae (32), (33) and (34) here below, and mixtures thereof:

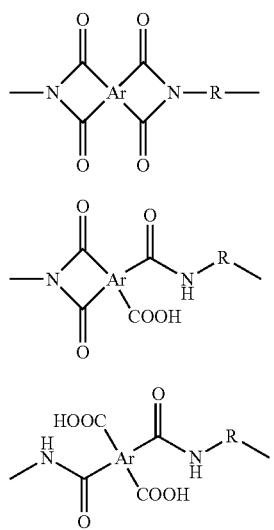

where:
Ar is chosen from:

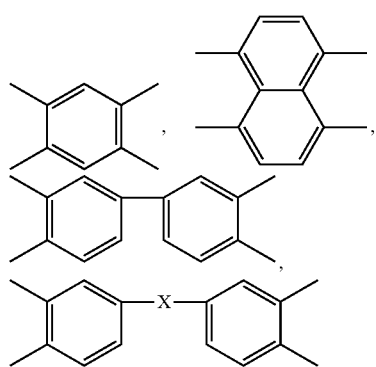

and mixtures thereof, with X being chosen from

with n=1, 2, 3, 4 or 5,

and mixtures thereof;

R is chosen from:

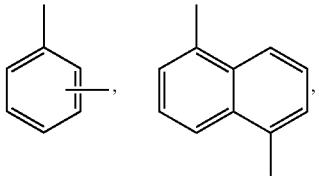

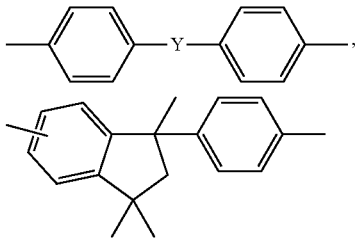

and mixtures thereof,
with Y being chosen from

with n=0, 1, 2, 3, 4 or 5,

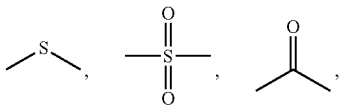

and mixtures thereof.

In a second particular embodiment, the aromatic polyimide (P2) is an aromatic polyamide-imide. For the purpose of the present invention, an aromatic polyamide-imide is intended to denote any polymer of which more than 50 wt. % of the recurring units (R1) comprise at least one aromatic ring, at least one imide group, as such and/or in its amic acid form, and at least one amide group which is not included in the amic acid form of an imide group [recurring units (R1b)].

The recurring units (R1b) are preferably chosen from recurring units (35), (36) and mixtures thereof

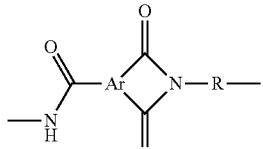

(imide form) (35)

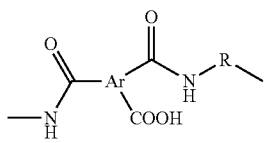

(amic acid form) (36)

where:
Ar is chosen from:

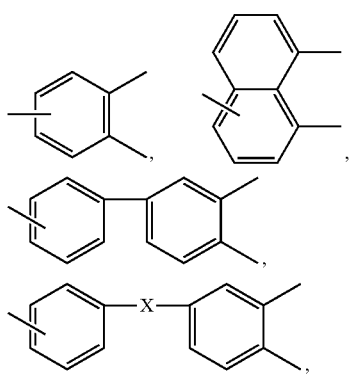

and mixtures thereof
with X being chosen from

with n=1, 2, 3, 4 or 5,

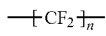

with n=1, 2, 3, 4 or 5,

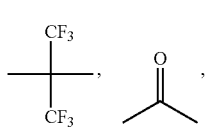

and mixtures thereof;

R is chosen from:

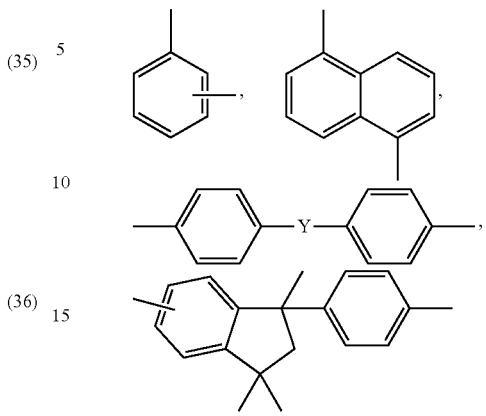

and mixtures thereof,
with Y being chosen from

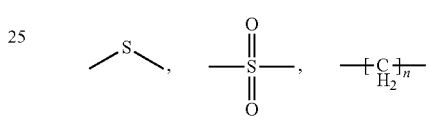

with n=1, 2, 3, 4 or 5,

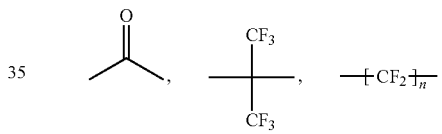

with n=1, 2, 3, 4 or 5, and mixtures thereof.
More preferably, recurring units (R1b) are chosen from:

(R1b-1)

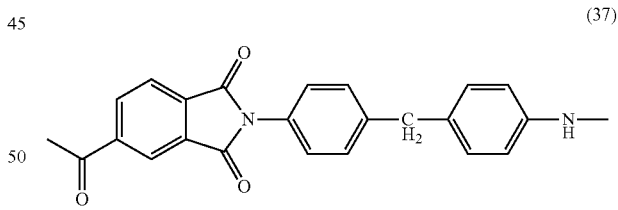

(37)

and/or the corresponding amide-amic acid containing recurring unit:

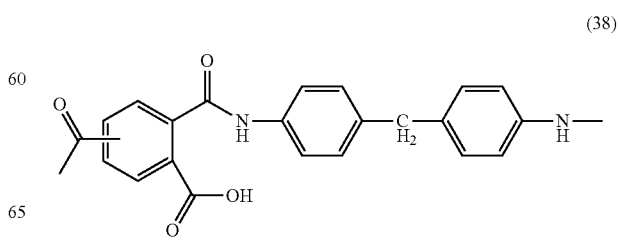

(38)

wherein the attachment of the two amide groups to the aromatic ring as shown in formula (38) will be understood to represent the 1,3 and the 1,4 polyamide-amic acid configurations;

(R1b-2)

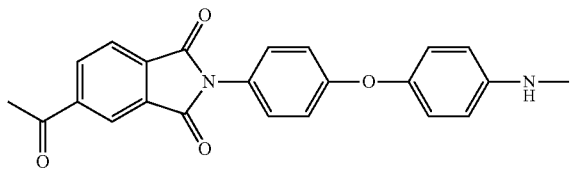
(39)

and/or the corresponding amide-amic acid containing recurring unit:

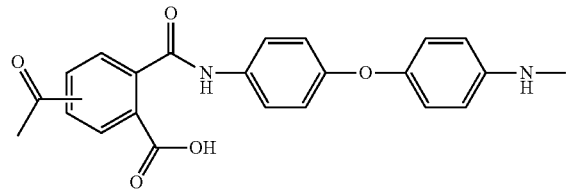
(40)

wherein the attachment of the two amide groups to the aromatic ring as shown in formula (40) will be understood to represent the 1,3 and the 1,4 polyamide-amic acid configurations; and (R1b-3)

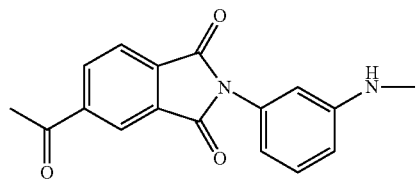
(41)

and/or the corresponding amide-amic acid containing recurring unit:

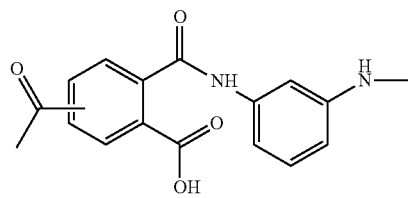
(42)

wherein the attachment of the two amide groups to the aromatic ring as shown in formula (42) will be understood to represent the 1,3 and the 1,4 polyamide-amic acid configurations.

Recurring units (R1b) are preferably a mix of recurring units (R1b-2) and (R1b-3). Excellent results were obtained with polyamide-imides essentially all, if not all, the recurring units comply with this criterion, which are notably commercially available from Solvay Advanced Polymers as TORLON® polyamide-imides.

The aromatic polyamide-imide can be notably manufactured by a process including the polycondensation reaction between (i) at least one acid monomer chosen from trimellitic anhydride and trimellitic anhydride monoacid halides and (ii) at least one comonomer chosen from diamines and diisocyanates.

Among the trimellitic anhydride monoacid halides, trimellitic anhydride monoacid chloride is preferred.

The comonomer preferably comprises at least one aromatic ring. Besides, it comprises preferably at most two aromatic rings. More preferably, the comonomer is a diamine Still more preferably, the diamine is chosen from the group consisting of 4,4'-diaminodiphenylmethane, 4,4'-diaminodiphenylether, m-phenylenediamine and mixtures thereof.

In a third embodiment, the aromatic polyimide (P2) is an aromatic polyetherimide. For the purpose of the present invention, an aromatic polyetherimide is intended to denote any polymer of which more than 50 wt. % of the recurring units (R1) comprise at least one aromatic ring, at least one imide group, as such and/or in its amic acid form, and at least one ether group [recurring units (R1c)].

Recurring units (R1-c) may optionally further comprise at least one amide group which is not included in the amic acid form of an imide group.

A first class of aromatic polyetherimides consists of those wherein the recurring units (R1) are chosen from:

(R1c-1)

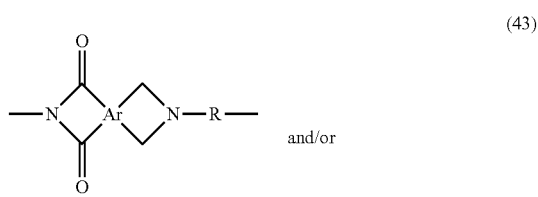
(43)

and/or

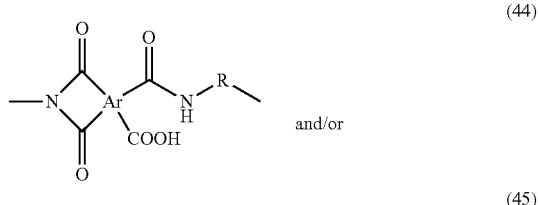
(44)

and/or

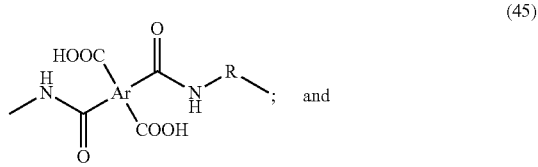
(45)

; and

-continued (R1c-2)

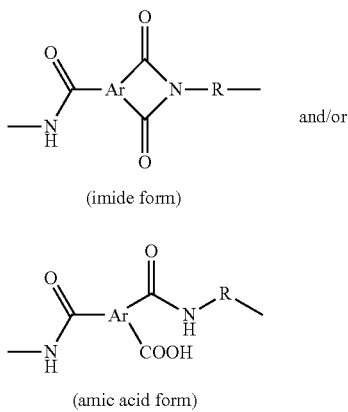
(imide form)

and/or

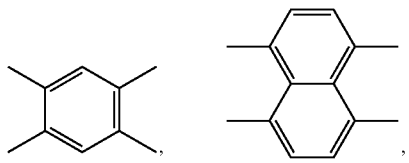
(amic acid form)

where:
Ar is chosen from:

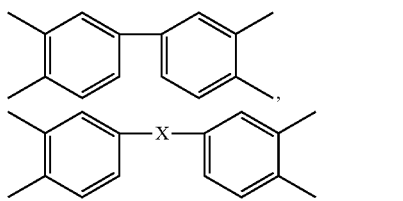

and mixtures thereof with X being chosen from

with n=1, 2, 3, 4 or 5,

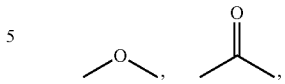

and mixtures thereof;
R is an ether-containing moiety chosen from

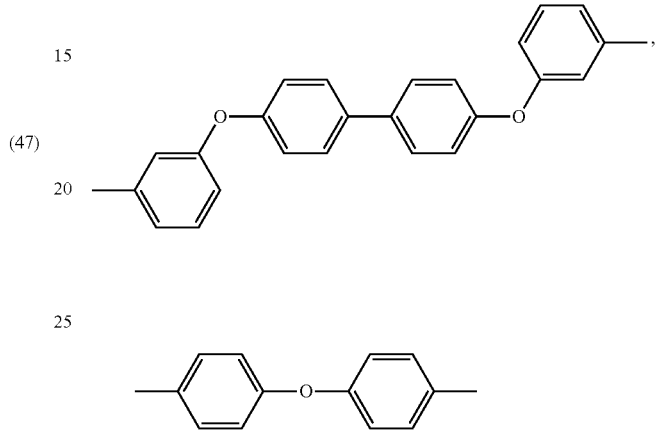

and mixtures thereof,

Insofar as this first class of aromatic polyetherimides is concerned, a preferred Ar group is

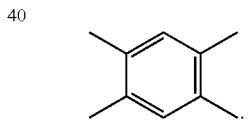

Very preferred aromatic polyimides (P2) belonging to this first class of aromatic polyetherimides are those wherein the recurring units (R1) are of formula:

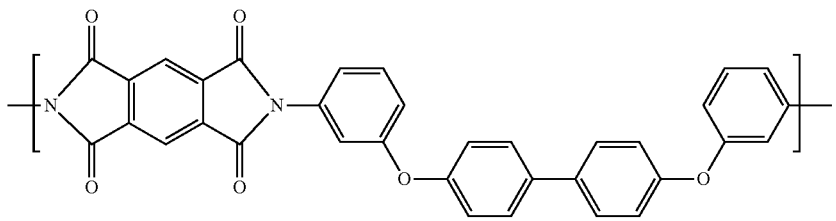
(48-a)

and/or its two corresponding amic acid forms [see formulae (44) and (45) vs. the wholly imide form of formula (43)].

Aromatic polyetherimides wherein essentially all, if not all, the recurring units are of formula (48-a), and/or their two corresponding amic acid forms, are notably commercially available from Mitsui as AURUM® polyimide.

Other very preferred aromatic polyimides (P2) belonging to this first class of aromatic polyetherimides are those wherein the recurring units (R1) are of formula:

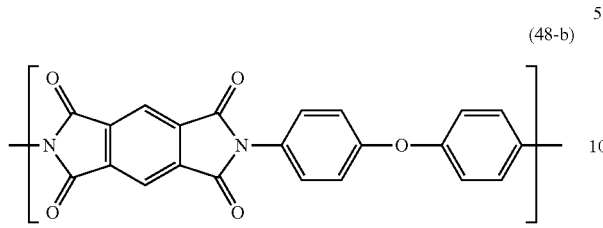
(48-b)

and/or its two corresponding amic acid forms [see formulae (44) and (45) vs. the wholly imide form of formula (43)].

Aromatic polyetherimides wherein essentially all, if not all, the recurring units are of formula (48-b), and/or their two corresponding amic acid forms, are notably commercially available from DuPont as VESPEL® polyimides.

A second class of aromatic polyetherimides consists of those wherein the recurring units (R1) are recurring units (R1c-4)

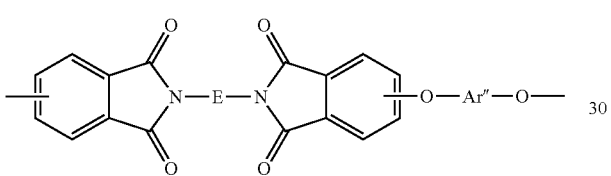
(49)

as such, and/or in their amic acid forms

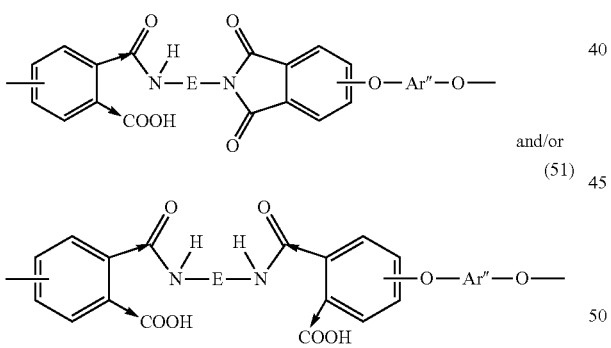
(50)
and/or
(51)

wherein:
the → denotes isomerism so that in any recurring unit the groups to which the arrows point may exist as shown or in an interchanged position;
E is chosen from:

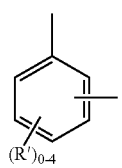
(E-i)

with the R' being, independently from each other, alkyl radicals comprising from 1 to 6 carbon atoms, aryls or halogens;

(E-ii)

with n=integer from 1 to 6;

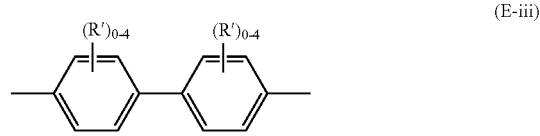
(E-iii)

with the R' being, independently from each other, alkyl radicals comprising from 1 to 6 carbon atoms, aryls or halogens;

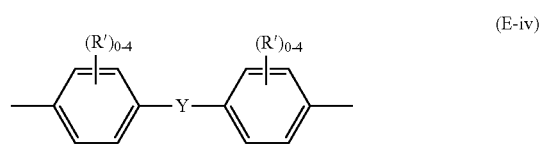
(E-iv)

with the R' being, independently from each other, alkyl radicals comprising from 1 to 6 carbon atoms, aryls or halogens;

and Y being chosen from:
(Y-i) alkylenes of 1 to 6 carbon atoms, in particular

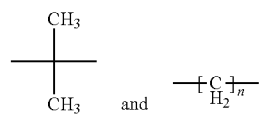

with n=integer from 1 to 6,
(Y-ii) perfluoroalkylenes of 1 to 6 carbon atoms, in particular

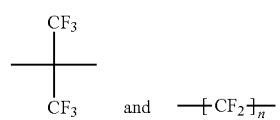

with n=integer from 1 to 6,
(Y-iii) cycloalkylenes of 4 to 8 carbon atoms;
(Y-iv) alkylidenes of 1 to 6 carbon atoms;
(Y-v) cycloalkylidenes of 4 to 8 carbon atoms;

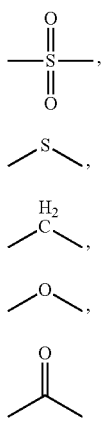 (Y-vi)

(Y-vii)

(Y-viii)

(Y-ix)

(Y-x)

Ar" is selected from:
(Ar"-i) aromatic hydrocarbon radicals having from 6 to 20 carbon atoms and halogenated substituted thereof, or alkyl substituted derivatives thereof, wherein the alkyl substituting group contains 1 to 6 carbon atoms, such as:

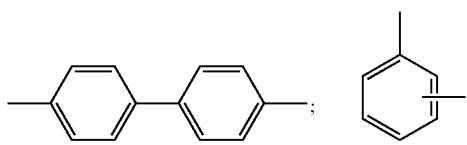

and halogenated substituted thereof, or alkyl substituted derivatives thereof, wherein the alkyl substituting group contains from 1 to 6 carbon atoms;

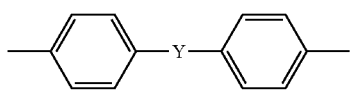 (Ar"-ii)

with Y being chosen from (Y-i), (Y-ii), (Y-iii), (Y-iv), (Y-v), (Y-vi), (Y-vii), (Y-viii), (Y-ix) and (Y-x), as above defined,
(Ar"-iii) alkylene and cycloalkylene radicals having from 2 to 20 carbon atoms, and
(Ar"-iv) terminated polydiorganosiloxanes.

The aromatic polyetherimides wherein the recurring units (R1) are recurring units (R1c-4) may be prepared by any of the methods well-known to those skilled in the art including the reaction of any aromatic bis(ether anhydride)s of the formula

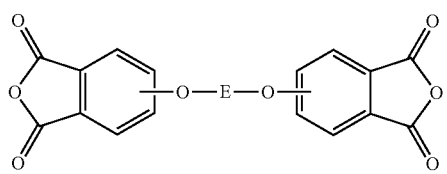 (52)

where E is as defined hereinbefore, with a diamino compound of the formula

 (53)

where Ar" is as defined hereinbefore. In general, the reactions can be advantageously carried out employing well-known solvents, e.g., o-dichlorobenzene, m-cresol/toluene, N,N-dimethylacetamide (DMAc), etc., in which to effect interaction between the dianhydrides and diamines, at temperatures of from about 20° C. to about 250° C.

Alternatively, these polyetherimides can be prepared by melt polymerization of any dianhydrides of formula (52) with any diamino compound of formula (53) while heating the mixture of the ingredients at elevated temperatures with concurrent intermixing.

The aromatic bis(ether anhydride)s of formula (52) include, for example:
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4 (3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy) diphenyl-2,2-propane dianhydride; etc. and mixtures of such dianhydrides.

The organic diamines of formula (53) include, for example, m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine.

In the recurring units (R1c-4), E is preferably chosen from (E-i)

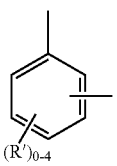

with the R' being, independently from each other, alkyl radicals comprising from 1 to 6 carbon atoms, aryls or halogens; more preferably, E is unsubstituted m-phenylene.

Besides, in the recurring units (R1c-4), Ar" is preferably chosen from (Ar"-ii)

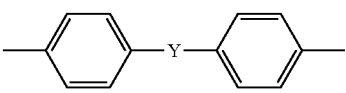

with Y being chosen from (Y-i), (Y-ii), (Y-iii), (Y-iv), (Y-v), (Y-vi), (Y-vii), (Y-viii), (Y-ix) and (Y-x), as above defined.
More preferably, Ar" is

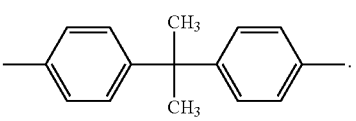

Good results are obtained when the recurring units (R1c-4) are recurring units of formula (54) as such, in imide form, and/or in amic acid forms [formulae (55) and (56)]:

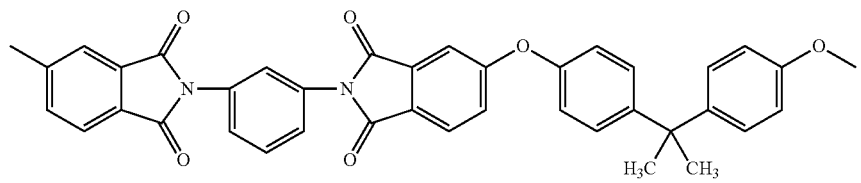

(54)

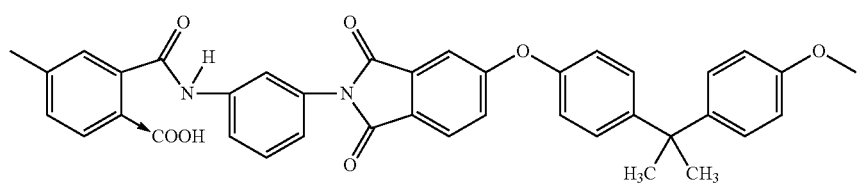

and/or (55)

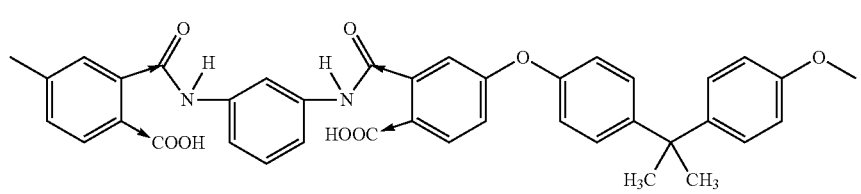

and/or (56)

wherein in formulae (55) and (56) the → denotes isomerism so that in any recurring unit the groups to which the arrows point may exist as shown or in an interchanged position.

Excellent results are obtained when the recurring units (R1c-4) are recurring units of formula (54) as such, in imide form, and/or in amic acid forms [formulae (55) and (56)].

Aromatic polyetherimides of which essentially all, if not all, the recurring units are of formula (54), and/or their corresponding amic acid forms (55) and/or (56) are commercially available from General Electric, now SABIC, as ULTEM® polyetherimides.

Good results may be also obtained when the recurring units (R1c-4) are recurring units of formula (57) as such, in imide form, and/or in amic acid forms [formulae (58) and (59)], as represented below:

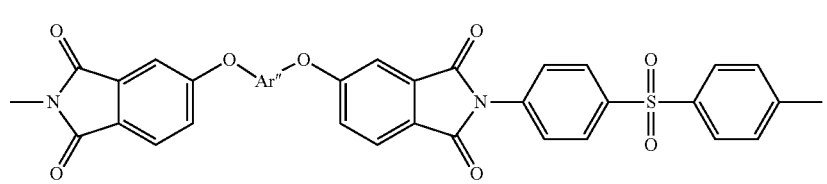

(57)

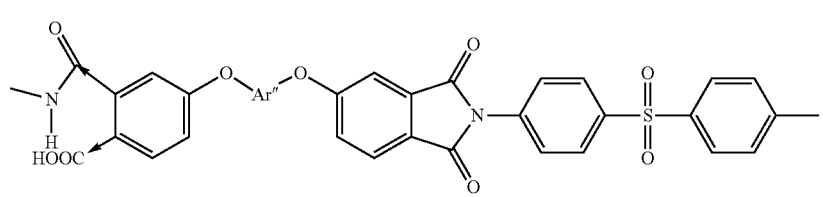

(58)

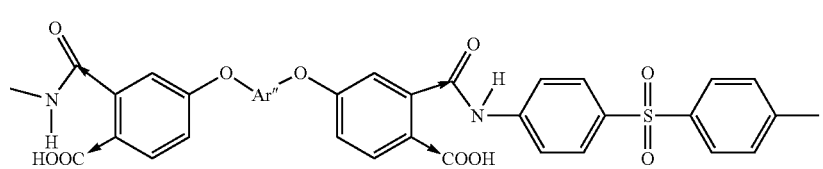

(59)

wherein:
(58) and (59) are the amic acid forms corresponding to the imide form of formula (57);
the → denotes isomerism so that in any recurring unit the groups to which the arrows point may exist as shown or in an interchanged position;
Ar" is chosen among the following structures:

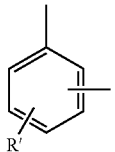

with the linking groups being in ortho, meta or para position and R' being a hydrogen atom or an alkyl radical comprising from 1 to 6 carbon atoms,

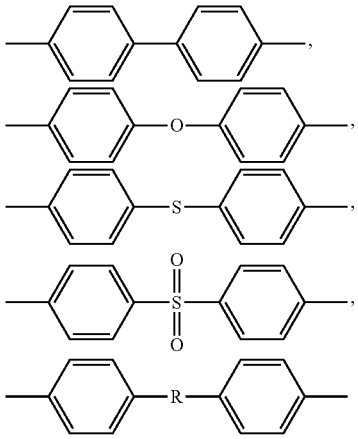

with R being an aliphatic divalent group of up to 6 carbon atoms, such as methylene, ethylene, isopropylene and the like,
and mixtures thereof.

Aromatic polyetherimides of which essentially all, if not all, the recurring units are of formula (57), and/or their corresponding amic acid forms of formula (58) and/or formula (59) are commercially available from General Electric, now SABIC, as EXTEM® polyetherimides.

Preferably more than 75 wt. % and more preferably more than 90 wt. % of the recurring units of the aromatic polyimide (P2) are recurring units (R1). Still more preferably, essentially all, if not all, the recurring units of the aromatic polyimide (P2) are recurring units (R1).

The polymer composition can comprise one and only one aromatic polyimide (P2). Alternatively, it can comprise two, three, or even more than three aromatic polyimides (P2).

Systems

New powertrain component systems have been developed employing polymeric bearing articles that are exposed to ultra-high PV conditions within the system. These powertrain component systems may include component systems of an engine (such as an internal combustion engine), a transmission, or a differential. In a particular embodiment, the powertrain component system is a transmission, such as an automatic transmission, a manual transmission, a continuous-variable transmission, or a dual-clutch transmission. For example, the polymeric bearing article may be employed as a component of a clutch, a torque converter, a torque damper, or a concentric slave cylinder. The polymeric bearing articles may be employed in light duty transmission component systems, heavy duty transmission component systems, and in off-road transmission component systems.

The term "bearing article" refers to articles with a bearing surface that are subjected to relatively high loads, relatively high speeds, or both. "Bearing articles" and "bearings," as used herein, refers to any article(s) having a surface that interacts with a surface in relative motion, for example, by sliding, pivoting, oscillating, reciprocating, rotating, or the like. Examples of such articles include, but are not limited to, thrust bearings, sleeve bearings, journal bearings, thrust washers, rub strips, bearing pads, needle bearings, ball bearings, including the balls, valve seats, piston rings, valve guides, compressor vanes, and seals, both stationary and dynamic. In certain embodiments, the bearing article may be an axial bearing, e.g., a thrust bearing. The presently disclosed axial bearings advantageously may replace needle bearings in ultra-high PV systems.

The polymeric bearing article comprises a polymer composition comprising at least one polymer having a glass transition temperature of at least about 140° C. and at least one friction and wear additive. The weight of the polymer composition, based on the weight of the polymeric bearing article, exceeds usually 10%, and is often above 50%, or even above 90%; in many embodiments, the polymeric bearing article consists of the polymer composition. The polymeric bearing article can either consist of one part, or it can consist of several parts. The polymeric bearing article can notably consist of several parts, wherein at least one of said parts, and possibly all of them, consist of the polymer composition; when at least one part of a multi-part polymeric bearing article consists of a material other than the polymer composition (e.g. metal or steel) [hereinafter, the other part], the weight of said other part, based on the weight of the polymeric bearing article, is usually less than 90%, and is often less than 50%, or even less than 10%. In accordance with the present invention, a certain preferred polymeric bearing article is a single part consisting of the polymer composition; another preferred polymeric bearing article consists of several parts consisting of the polymer composition.

Preferably, the system also includes a lubricant, for example a motor oil or a transmission oil.

Another aspect of the present invention concerns a powertrain component comprising the polymeric bearing articles that are exposed to ultra-high PV conditions when employed in powertrain component systems as described above. The term "polymeric bearing articles" denotes those polymeric bearing articles as described above. The powertrain component can for example be a clutch, a torque converter, a torque damper, or a concentric slave cylinder.

Figure 2:
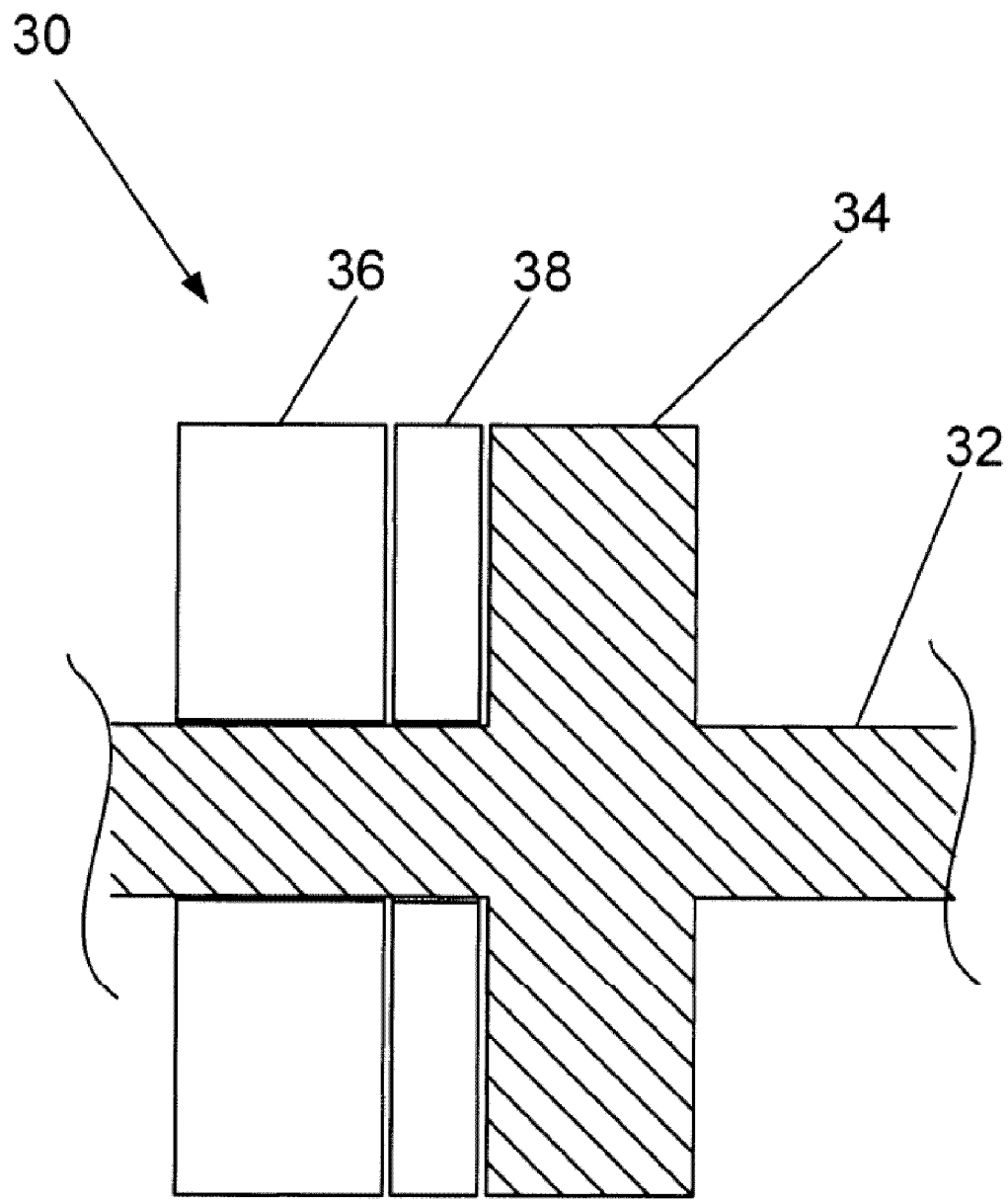
FIG. 2 is a cross-sectional view of a system employing a polymeric bearing in accordance with one or more embodiments of the present invention.

FIG. 2 illustrates a system 130, such as a powertrain component, employing a polymeric bearing article 138, such as polymeric thrust bearing, e.g., the polymeric thrust bearing 110 of FIG. 1. In the exemplified embodiment, the polymeric bearing article 138 is disposed on a shaft 132 between a rotating component 134 and a stationary component 136. In some embodiments, the stationary component 136 may, alternatively, be a counter-rotating component or a component rotating at a different angular velocity than the rotating component 134 that rotates with the shaft 132. The system 130 may include a lubricant, such as a motor oil or transmission oil, that is provided between the interfacing surfaces of the polymeric bearing article 138, the stationary component 136, the rotating component 134, and the shaft 132. The system 130 may circulate the lubricant, e.g., to and from the interfacing surfaces, under a starved-fed lubrication regime or under a fully-lubricated regime. In a starved-fed regime, the lubricant may be circulated at a flow rate of about 0.025 L/min or less. In a fully-lubricated regime which is preferred, the lubricant may be circulated at a flow rate of about 0.025 L/min or more, for example, about 0.025 L/min to about 1 L/min, or about 0.025 L/min to about 0.1 L/min, or about 0.025 L/min to about 0.05 L/min. In some embodiments, the system exposes the polymeric bearing article 138 to a lubricant temperature of about 90° C. or more, about 120° C. or more, or about 130° C. or more.

In an exemplary embodiment, the polymeric bearing article 138 consists of a polymeric matrix material and one or more additives that improve the performance properties of the polymeric matrix material. In some embodiments, the polymeric matrix material comprises a polymer that has a $T_g$ of about 140° C. or more. In certain embodiments, the polymer has a $T_g$ of about 200° C. or more, about 240° C. or more, or about 270° C. or more. In some embodiments, the polymeric bearing article 138 comprises a material that has a COF of about 0.04 or less in a lubricated system. In certain embodiments, the polymeric bearing article 138 comprises a material that has a COF in a lubricated system of about 0.03 or less, 0.02 or less, or 0.01 or less. In some embodiments, the polymeric bearing article 138 has a PV limit of about 1,100,000 psi-fpm (23540 kg/cm$^2$×m/min) or more. In certain embodiments, the polymeric bearing article 138 has a PV limit of about 1,500,000 psi-fpm (32,100 kg/cm$^2$×m/min) or more, about 1,750,000 psi-fpm (37,450 kg/cm$^2$×m/min) or more, or about 2,000,000 psi-fpm (42,800 kg/cm$^2$×m/min) or more, most preferably about 2,500,000 psi-fpm (53,500 kg/cm$^2$×m/min) or more, or about 3,000,000 psi-fpm (64,200 kg/cm$^2$×m/min) or more. In some embodiments, the polymeric bearing article 138 has a WF of about 0.2 or less. In certain embodiments, the polymeric bearing article 138 has a WF of about 0.1 or less, 0.05 or less, or 0.01 or less. In a preferred embodiment, the polymeric thrust bearing 110 has a WF of about 1.0 or less, 0.80 or less, 0.60 or less, 0.50 or less, 0.20 or less, 0.10 or less, 0.08 or less, 0.05 or less, or 0.01 or less.

It is understood that the coefficient of friction (COF) and Wear Factor (WF) are measured according to the modified ASTM D3702 method, as described above.

The polymeric matrix material may comprise a PI (such as an aromatic PAI), a PAEK (such as a PEEK), or PPA polymer. Various additives may be incorporated into the polymeric matrix material. In some embodiments, the polymeric bearing article 138 includes PTFE, graphite, and/or MoS$_2$ incorporated into or onto the polymeric matrix material. In some embodiments, the polymeric bearing article 138 may comprise carbon fiber incorporated into the polymeric matrix material.

In some embodiments, the system 130 subjects the polymeric bearing article 138 to a velocity and a pressure such that the product of the velocity and the pressure is at about 1,100,000 psi-fpm (23540 kg/cm$^2$×m/min) or more. In certain embodiments, the system 130 subjects the polymeric bearing article 138 to a velocity and a pressure such that the product of the velocity and the pressure is of about 1,500,000 psi-fpm (32,100 kg/cm$^2$×m/min) or more, about 1,750,000 psi-fpm (37,450 kg/cm$^2$×m/min) or more, about 2,000,000 psi-fpm (42,800 kg/cm$^2$×m/min) or more, most preferably about 2,500,000 psi-fpm (53,500 kg/cm$^2$×m/min) or more, or about 3,000,000 psi-fpm (64,200 kg/cm$^2$×m/min)

In an exemplary embodiment, the system 130 subjects the polymeric bearing article 138 to a pressure of about 200 psi (14.06 kg/cm$^2$) or more, about 300 psi (21.09 kg/cm$^2$) or more, 400 psi (28.12 kg/cm$^2$) or more, 500 psi (35.15 kg/cm$^2$) or more, 600 psi (42.18 kg/cm$^2$) or more, or 700 psi (49.21 kg/cm$^2$) or more. In an exemplary embodiment, the system 130 subjects the polymeric bearing article 138 to a speed of about 2800 fpm (853.44 m/min) or more, 3000 fpm (914.40 m/min) or more, or 3200 fpm (975.36 m/min) or more. In some embodiments, the system 130 subjects the polymeric bearing article 138 to a pressure of about 200 psi (14.06 kg/cm$^2$) to about 2500 psi (175.75 kg/cm$^2$) and a velocity of about 440 fpm (134.11 m/min) to about 5500 fpm (1676.40 m/min), wherein the product of P and V is about 1,100,000 psi-fpm (23540 kg/cm$^2$×m/min) or more. In an exemplary embodiment, the system 130 subjects the polymeric bearing article 138 to a pressure of about 300 psi (21.09 kg/cm$^2$) to about 900 psi (63.27 kg/cm$^2$), and a speed of about 2800 fpm (853.44 m/min) to about 3600 fpm (1097.28 m/min)

Methods

New methods have been developed for employing polymeric bearing articles in ultra-high PV environments. In an exemplary embodiment, the method includes subjecting a polymeric bearing article to a velocity and a pressure such that the product of the velocity and the pressure is at least about 1,100,000 psi-fpm (23540 kg/cm$^2$×m/min). For example, the polymeric bearing article may be employed in a powertrain component system that subjects the to an ultra-high PV environment. In certain embodiments, the polymeric bearing article may be subjected to ultra-high PV conditions in a system to reduce friction between rotating components, such as in the system 130 illustrated in FIG. 2. In some embodiments, the polymeric bearing article is a polymeric thrust bearing, such as the polymeric thrust bearing 110 of FIG. 1. In an exemplary embodiment, the polymeric bearing article is employed in a lubricated environment in which a lubricant is disposed on interfacing surfaces of the polymeric bearing article. The method may include circulating the lubricant, e.g., to and from the interfacing surfaces, under a starved-fed lubrication regime or under a fully-lubricated regime. In a starved-fed regime, the lubricant may be circulated at a flow rate of about 0.025 L/min or less. In a fully-lubricated regime, the lubricant may be circulated at a flow rate of about 0.025 L/min or more, for example, about 0.025 L/min to about 1 L/min, or about 0.025 L/min to about 0.1 L/min, or about 0.025 L/min to about 0.05 L/min. In some embodiments, the method may include exposing the polymeric bearing article to a lubricant temperature of about 90° C. or more, about 120° C. or more, or about 130° C. or more.

In an exemplary embodiment, the polymeric bearing article consists of a polymeric matrix material and one or more additives that improve the performance properties of the polymeric matrix material. In some embodiments, the polymeric matrix material comprises a polymer that has a $T_g$ of about 140° C. or more. In certain embodiments, the polymer has a $T_g$ of about 200° C. or more, about 240° C. or more, or about 270° C. or more. In some embodiments, the polymeric bearing article comprises a material that has a COF of about 0.04 or less in a lubricated system. In certain embodiments, the polymeric bearing article comprises a material that has a COF in a lubricated system of about 0.03 or less, 0.02 or less, or 0.01 or less. In some embodiments, the polymeric bearing article has a PV limit of about 1,100,000 psi-fpm (23540 kg/cm$^2$×m/min) or more. In certain embodiments, the polymeric bearing article has a PV limit of about 1,500,000 psi-fpm (32,100 kg/cm$^2$×m/min) or more, about 1,750,000 psi-fpm (37,450 kg/cm$^2$×m/min) or more, about 2,000,000 psi-fpm (42,800 kg/cm$^2$×m/min) or more, most preferably about 2,500,000 psi-fpm (53,500 kg/cm$^2$×m/min) or more, or about 3,000,000 psi-fpm (64,200 kg/cm$^2$×m/min) or more. In some embodiments, the polymeric bearing article has a WF of about 0.2 or less. In certain embodiments, the polymeric bearing article has a WF of about 0.1 or less, 0.05 or less, or 0.01 or less. In a preferred embodiment, the polymeric thrust bearing 110 has a WF of about 1.0 or less, 0.80 or less, 0.60 or less, 0.50 or less, 0.20 or less, 0.10 or less, 0.08 or less, 0.05 or less, or 0.01 or less.

It is understood that the coefficient of friction (COF) and Wear Factor (WF) are measured according to the modified ASTM D3702 method, as described above.

The polymeric matrix material may comprise a PI (such as an aromatic PAI), a PAEK (such as a PEEK), or PPA polymer. Various additives may be incorporated into the polymeric matrix material. In some embodiments, the polymeric bearing article includes PTFE, graphite, and/or $MoS_2$ incorporated into the polymeric matrix material. In some embodiments, the polymeric bearing article may comprise carbon fiber incorporated into the polymeric matrix material.

In some embodiments, the method includes subjecting the polymeric bearing article 38 to a velocity and a pressure such that the product of the velocity and the pressure is at about 1,100,000 psi-fpm (23540 kg/cm$^2$×m/min) or more. In certain embodiments, the method includes subjecting the polymeric bearing article to a velocity and a pressure such that the product of the velocity and the pressure is of about 1,500,000 psi-fpm (32,100 kg/cm$^2$×m/min) or more, about 1,750,000 psi-fpm (37,450 kg/cm$^2$×m/min) or more, about 2,000,000 psi-fpm (42,800 kg/cm$^2$×m/min) or more, most preferably about 2,500,000 psi-fpm (53,500 kg/cm$^2$×m/min) or more, or about 3,000,000 psi-fpm (64,200 kg/cm2×m/min) or more. The polymeric bearing article may be exposed to such ultra-high PV conditions intermittently or continuously over substantial periods.

In an exemplary embodiment, the method includes subjecting the polymeric bearing article to a pressure of about 200 psi (14.06 kg/cm$^2$) or more, or about 300 psi (21.09 kg/cm$^2$) or more, 400 psi (28.12 kg/cm$^2$) or more, 500 psi (35.15 kg/cm$^2$) or more, 600 psi (42.18 kg/cm$^2$) or more, or 700 psi (49.21 kg/cm$^2$) or more. In an exemplary embodiment, the method includes subjecting the polymeric bearing article to a speed of about 2800 fpm (853.44 m/min) or more, 3000 fpm or more, or 3200 fpm (975.36 m/min) or more. In some embodiments, the method includes subjecting the polymeric bearing article to a pressure of about 200 psi (14.06 kg/cm$^2$) to about 2500 psi (175.75 kg/cm$^2$) and a velocity of about 440 fpm (134.11 m/min) to about 5500 fpm, wherein the product of P and V is about 1,100,000 psi-fpm (23540 kg/cm$^2$×m/min) or more. In an exemplary embodiment, the method includes subjecting the polymeric bearing article to a pressure of about 300 psi (21.09 kg/cm$^2$) to about 900 psi (63.27 kg/cm$^2$), and a speed of about 2800 fpm (853.44 m/min) to about 3600 fpm (1097.28 m/min).

EXAMPLE ONE

Figure 4:
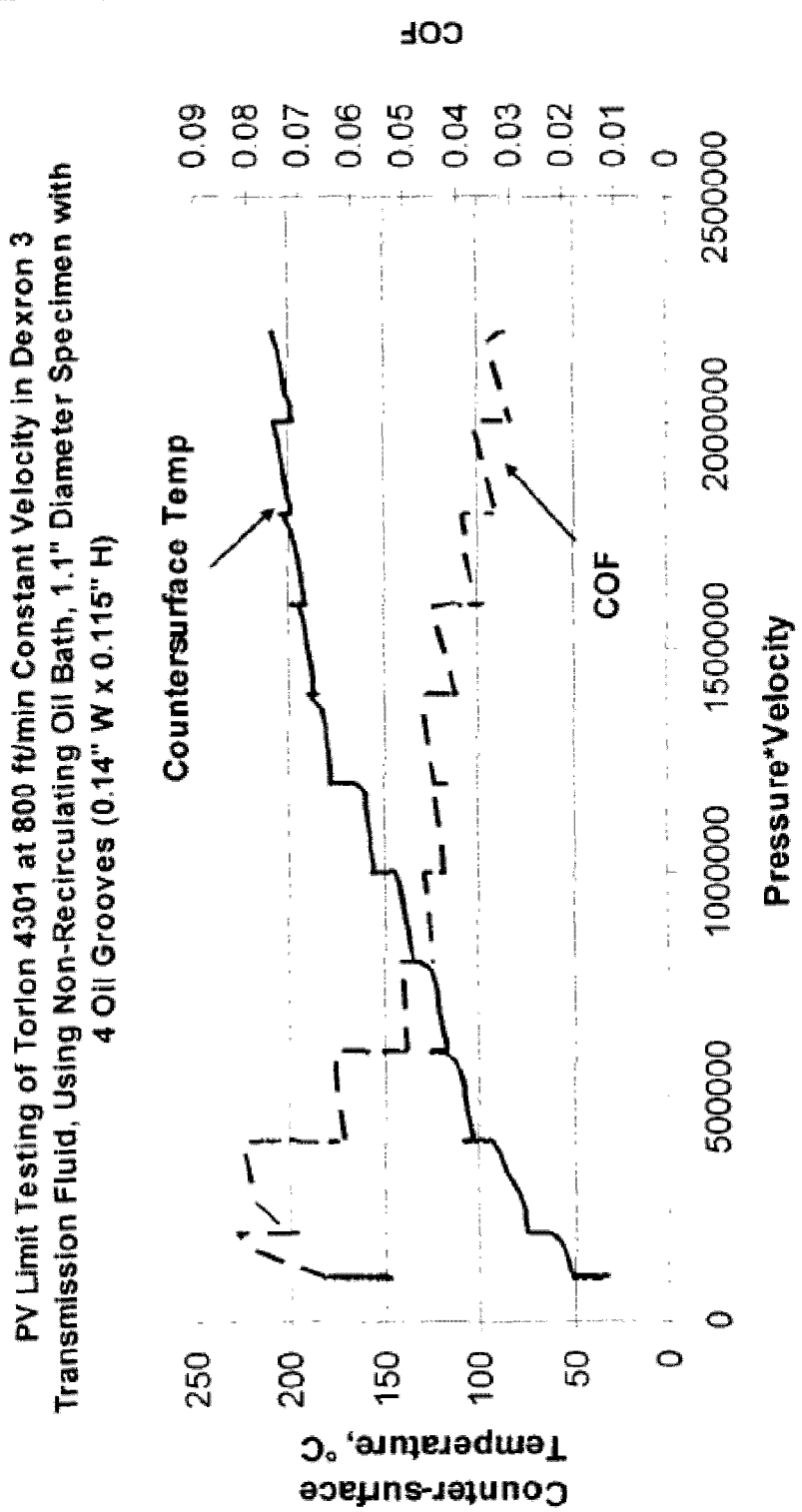
FIG. 4 is a graph, illustrating measured specimen temperature and coefficient of friction (COF) for a test run using the test apparatus of FIG. 3 with a polymeric bearing article that was subjected to PV limit testing in a bath of automatic transmission fluid.

A polymeric bearing article composed of 85% by weight Torlon neat resin 4000T (Solvay Advanced Polymers, LLC), 12% by weight graphite, and 3% PTFE was analyzed using the test apparatus 140 of FIG. 3. The polymeric bearing article had a 1.1 inch (2.79 cm$^2$) diameter and four radial grooves. Each radial groove had a width of 0.14 inches, and a depth of 0.115 inches. Two test runs were performed to analyze the PV limit of the polymeric bearing article. On each run, the velocity was maintained at 800 ft/min and pressure was ramped up to about while the polymeric bearing article was maintained in a bath of Valvoline Dexron III® automatic transmission fluid (Valvoline Oil Company). The results of these test runs are illustrated in FIG. 4. The polymeric bearing article was stable at 2,000,000 psi-fpm (42,800 kg/cm$^2$×m/min).

EXAMPLE TWO

Figure 5:
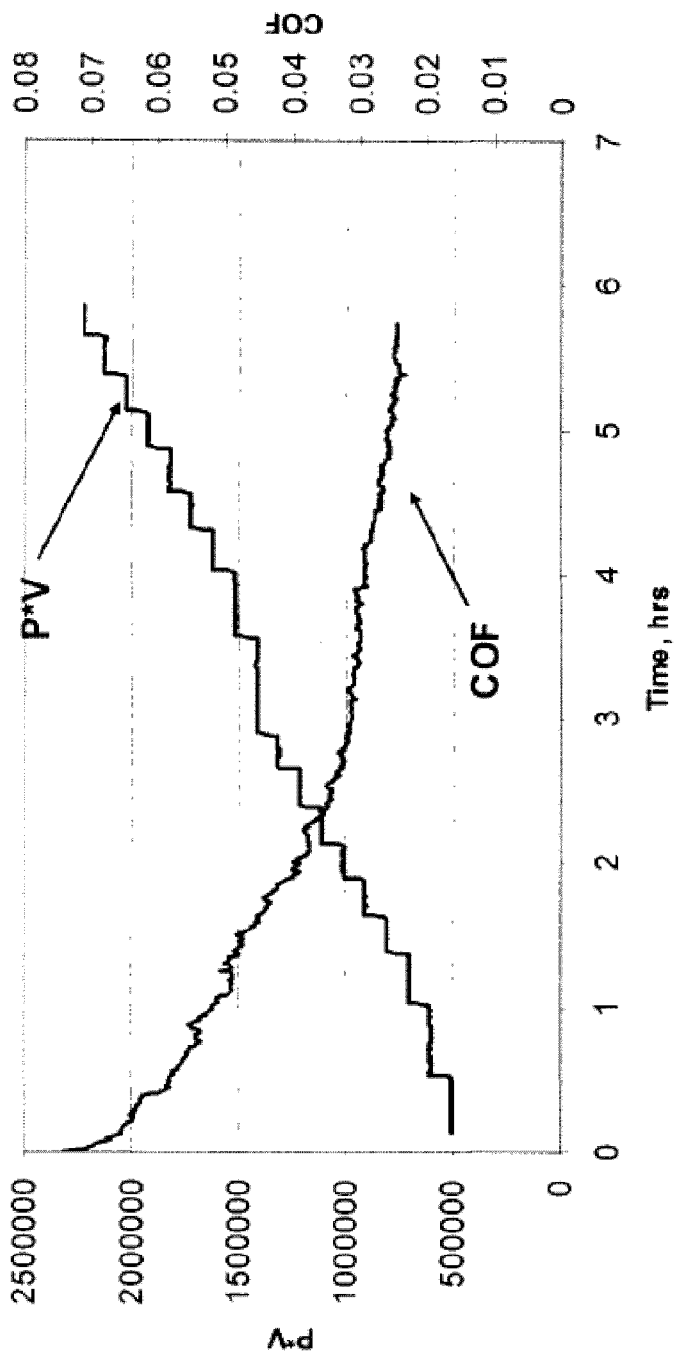
FIG. 5 is a graph, illustrating measured PV and coefficient of friction (COF) for a test run using the test apparatus of FIG.

A polymeric bearing article being formed of the formulation of EXAMPLE ONE was analyzed using the test apparatus 140 of FIG. 3. The polymeric bearing article had a 1.1 inch (2.79 cm$^2$) diameter and four radial grooves. Each radial groove had a width of 0.14 inches (3.56 cm), and a depth of 0.115 inches (2921 microns). The polymeric bearing article was subjected to a speed of 1550 fpm (472.75 m/min) in a bath of Valvoline Dexron III® automatic transmission fluid (Valvoline Oil Company) and the pressure was ramped up over a period of 6 hours. PV, COF, specimen temperature, and chamber temperature were measured during the test run. The results of the test run are illustrated in FIGS. 5, 6, and 7. The PV limit was greater than 2,000,000 psi-fpm (42,800 kg/cm$^2$×m/min).

EXAMPLE THREE

A polymeric bearing article being formed of the formulation of EXAMPLE ONE was analyzed using the test apparatus 140 of FIG. 3. The polymeric bearing article had a 1.1 inch (2.79 cm$^2$) diameter and four radial grooves. Each radial groove had a width of 0.14 inches (3.56 cm), and a depth of 0.115 inches (2921 microns). The polymeric bearing article was subjected to a pressure of 787 psi and a speed of 1550 fpm (472.75 m/min) in a bath of Valvoline Dexron III® automatic transmission fluid (Valvoline Oil Company). Chamber temperature, specimen temperature, COF and torque were measured. The results of the test run are illustrated in FIGS. 8 and 9. The wear factor of the specimen was about 0.2.

EXAMPLE FOUR

A polymeric bearing article being formed of the formulation of EXAMPLE ONE was analyzed using the test apparatus 140 of FIG. 3. The polymeric bearing article had a 1.1 inch (2.79 cm$^2$) diameter and four radial grooves. Each radial groove had a width of 0.14 inches (3.56 cm), and a depth of 0.115 inches (2921 microns). The polymeric bearing article was subjected to a pressure in excess of 1000 psi and a speed of 1770 fpm (539.496 m/min) with recirculation of Valvoline Dexron III® automatic transmission fluid (Valvoline Oil Company) at 0.025 L/min. Chamber temperature and countersurface temperature were measured. The results of the test run are illustrated in FIG. 10. The sample melted at about 1,840,000 psi-fpm (39376 kg/cm2×m/min).

EXAMPLE FIVE

A polymeric bearing article being formed of the formulation of EXAMPLE ONE was analyzed using the test apparatus 140 of FIG. 3. The polymeric bearing article had a 1.1 inch (2.79 cm$^2$) diameter and four radial grooves. Each radial groove had a width of 0.14 inches (3.56 cm), and a depth of 0.115 inches (2921 microns). The polymeric bearing article was subjected to a pressure in excess of 1700 psi and a speed of 1770 fpm (539.496 m/min) with recirculation of Valvoline Dexron III® automatic transmission fluid (Valvoline Oil Company) at 0.25 L/min. Chamber temperature and countersurface temperature were measured. The results of the test run are illustrated in FIG. 11. The test was stopped at 3,000,000 psi-fpm (64,200 kg/cm2×m/min).

EXAMPLE SIX

A polymeric bearing article being formed of the formulation of EXAMPLE ONE was analyzed using the test apparatus 140 of FIG. 3. The polymeric bearing article had a 1.1 inch (2.79 cm²) diameter and twenty radial grooves. Each radial groove had a width of 1 mm and a depth of 100 micron. The polymeric bearing article was subjected to a pressure of up to about 2000 psi and a speed of 1770 fpm (539.496 m/min) with recirculation of Valvoline Dexron III® automatic transmission fluid (Valvoline Oil Company) at 0.025 L/min. Chamber temperature and countersurface temperature were measured. The results of the test run are illustrated in FIG. 12. The test was stopped at about 2000 psi.

EXAMPLE SEVEN

A polymeric bearing article being formed of the formulation of EXAMPLE ONE was analyzed using the test apparatus 140 of FIG. 3. The polymeric bearing article had a 2 inch (5.08 cm) diameter and ten radial grooves. Each radial groove had a width of 4 mm and a depth of 500 micron. The polymeric bearing article was subjected to a pressure of up to about 2000 psi (140.60 kg/cm²) and a speed of 3222 fpm (982.066 m/min) with recirculation of Valvoline Dexron III® automatic transmission fluid (Valvoline Oil Company) at 0.025 L/min. Chamber temperature and countersurface temperature were measured. The results of the test run are illustrated in FIG. 13. The test was stopped at about 1,840,000 psi-fpm (39376 kg/cm2×m/min) due to overtorquing of the motor of the test apparatus.

It should be understood that the foregoing relates only to the preferred embodiments of the present application and that numerous changes and modifications may be made herein without departing from the general spirit and scope of the invention as defined by the following claims and the equivalents thereof.

EXAMPLE EIGHT

A polymeric bearing article composed of 78% by weight Torlon neat resin 4000T (Solvay Advanced Polymers, LLC), 20% by weight graphite, and 2% PTFE was analyzed using the test apparatus 140 of FIG. 3. The polymeric bearing article had a 2 inch (5.08 cm) diameter and twenty six radial grooves. Each radial groove had a width of 1 mm and a depth of 300 microns. The polymeric bearing article was subjected to a speed of 3222 fpm (982.066 m/min) with recirculation of Valvoline Dexron III® automatic transmission fluid (Valvoline Oil Company) at 90° C. and with a flow of 0.20 L/min. and the pressure was ramped up over a period of 6 hours. PV, COF, specimen temperature, and chamber temperature were measured during the test run. The COF was determined following the modified ASTM D3702 method, mentioned above. The results of the test run are illustrated in FIGS. 14 and 15. The PV limit was greater than 2,500,000 psi-fpm (53,500 kg/cm²×m/min).

EXAMPLE NINE

Determination of the Wear, Wear Rate and Wear Factor of the Polymeric Bearing Article Composed of 78% by Weight Torlon Neat Resin 4000T (Solvay Advanced Polymers, LLC), 20% by Weight Graphite, and 2% PTFE The wear, wear rate and wear factor were determined following the modified ASTM D3702 method, mentioned above, which was carried out as described in detail below.

The test specimen having an inner diameter of 1.869 inches (4.747 cm), an outer diameter of 2 inches (5.08 cm), a contact area of 0.326 in², mean radius of 0.967 in and 26 radial grooves, wherein each radial groove has a width of 1 mm and a depth of 300 microns, was prepared from an injection molded plaque made from the composition containing 78% by weight Torlon neat resin 4000T (Solvay Advanced Polymers, LLC), 20% by weight graphite, and 2% PTFE. The test specimen was recured. The specimen was further drilled with a center and off-set hole to fit into the large thrustwasher specimen holder of the test machine (a Multi-Specimen Falex® Test Machine, Computer Controlled Version (Serial No. 900631001816R; Falex Corporation, Sugar Grove, Ill.) and cleaned with methanol to remove any residual oils. The Multi-Specimen Falex® Test Machine, as described in ASTM D3702 and corresponding to the test apparatus 140 of FIG. 3, operated with the test specimen rotating under load against a stationary steel washer (e.g. stationary steel washer is 1018 steel with a 16±2 uin Ra surface roughness purchased from Falex, the original equipment manufacturer and as described in ASTM D3702) with recirculation of Valvoline Dexron III® automatic transmission fluid (Valvoline Oil Company) as the lubricant. The load is applied by a pneumatic system instead of application of dead weights to the 10:1 lever arm. The specimen thermocouple is positioned close to the counter surface (1.5 mm from sample) without toughing the sample.

The Valvoline Dexron III® automatic transmission fluid having a flow rate of 0.20 L/min was supplied at a temperature of 90° C. by a Leeson Speed Master gear pump from a 2 gallon temperature-controlled reservoir. The flow rate was controlled by a Hedland flow meter with 0.1-0.75 L/min flow capability. The transmission fluid was delivered into the base of the specimen table and was flowing up and across the rotating test surface from the center of the specimen. The transmission fluid was drained out of the chamber through a hole in the bottom and re-circulated back to the oil reservoir by gravity.

The test conditions were chosen as follow: A rotational speed of 6365 rpm; a load of 131 lbs (59.4 kg) for obtaining a Pressure P of 400 psi (28.12 kg/cm²), a Velocity (V) of 3222 ft/min (982.066 m/min) and a PV of 1,300,000 psi-fpm (27820 kg/cm²×m/min). Each test consisted of an initial break-in period of 25 hours, followed by a test duration of 25 hr, which was repeated until a total of 100 hours test time was reached, each at the same selected load and velocity. After each test duration of 25 hr, the test was stopped, the specimen holder was removed from the test rig and the test specimen was removed from the holder. After at least 1 hour at room temperature, the thickness change of the test specimen was measured with a micrometer capable of measuring to 0.0001 in.

The measurement of the thickness of the test specimen was carried out at nine places instead of four places, as described in ASTM D3702. The test specimen was therefore marked at 9 places (e.g. lightly etched into the side of the test specimen) so that subsequent thickness measurements could be made at the same 8 places. The specimen was replaced in the specimen holder, placed into the test rig and the procedure was repeated until a total of 100 hours test time was reached and measuring after every 25 hours was repeated. The wear rate, expressed in wear per hour (in/hr), was calculated from the nine thickness measurements on the test specimen, notably expressed in $X_{1a}$, $X_{1b}$, $X_{1c}$, $X_{1d}$, $X_{1e}$, $X_{1f}$, $X_{1g}$, $X_{1h}$ and $X_{1i}$, performed after the wear the 25 hr break-in (before the first test duration of 25 hr) and the nine thickness measurements on the test specimen 146, notably expressed $X_{2a}$, $X_{2b}$, $X_{2c}$, $X_{2d}$, $X_{2e}$, $X_{2f}$, $X_{2g}$, $X_{2h}$ and $X_{2i}$, performed after the first test duration (T) of 25 hr.

The wear rate is specifically calculated by the following calculation:

$$\text{Wear Rate in m/hr(in./hr)} = [(X_{1a}+X_{1b}+X_{1c}+X_{1d}+X_{1e}+X_{1f}+X_{1g}+X_{1h}+X_{1i})-(X_{2a}+X_{2b}+X_{2c}+X_{2d}+X_{2e}+X_{2f}+X_{2g}+X_{2h}+X_{2i})]/9 \times T$$

wherein T=25 hr
X is thickness in inches (m)

The wear factor=Wear Rate/PV=Wear Rate/1,300,000

The results are summarized in Table 1.

velocity and the pressure is about 1,100,000 psi-fpm (23540 kg/cm²×m/min) or more.

9. The method of claim 8, wherein the polymeric thrust bearing is situated in a powertrain component system.

10. The method of claim 8, wherein the polymer composition comprises at least one aromatic polyimide and at least one friction and wear additive.

11. A powertrain component comprising the polymeric thrust bearing of claim 1.

12. The powertrain component of claim 11 which is a clutch, a torque converter, a torque damper, or a concentric slave cylinder.

TABLE 1

| Time | $X_a$ | $X_b$ | $X_c$ | $X_d$ | $X_e$ | $X_f$ | $X_g$ | $X_h$ | $X_i$ | Wear, in (microns) | Wear Rate, in/hr (m/hr) × 10⁻² | WF × 10⁻¹⁰ (in³ min)/(hr lb ft) (kg/cm² × m/min) *10⁻¹⁰ |
|---|---|---|---|---|---|---|---|---|---|---|---|---|
| 0 hrs | 0.1864 | 0.1866 | 0.1866 | 0.1864 | 0.1865 | 0.1865 | 0.1865 | 0.1869 | 0.1868 | | | |
| 25 hrs | 0.1805 | 0.1803 | 0.1802 | 0.1804 | 0.1806 | 0.1805 | 0.1806 | 0.1807 | 0.1806 | 0.0068 (174) | 0.0274 | 2.11 |
| 50 hrs | 0.1787 | 0.1787 | 0.1787 | 0.1789 | 0.1791 | 0.1789 | 0.1787 | 0.1787 | 0.1787 | 0.0019 (49) | 0.0076 | 0.59 |
| 75 hrs | 0.1778 | 0.1778 | 0.1778 | 0.178 | 0.1779 | 0.1777 | 0.1776 | 0.1777 | 0.1777 | 0.0011 (29) | 0.0045 | 0.35 |
| 100 hrs | 0.1778 | 0.1778 | 0.1778 | 0.1779 | 0.1779 | 0.1777 | 0.1775 | 0.1776 | 0.1776 | 5E−05 (1) | 0.0006 | 0.01 |

The invention claimed is:

1. A polymeric thrust bearing for an ultra-high PV environment comprising:
   an annular bearing body having a mating surface extending between an inner perimeter and an outer perimeter;
   a plurality of lubricant channels extending across the mating surface from the inner perimeter to the outer perimeter;
   said lubricant channels occupying about 5% to about 25% of the surface area of the mating surface;
   said annular bearing body comprising a polymer composition comprising at least one polymer having a glass transition temperature of at least about 140° C. and at least one friction and wear additive; and
   said polymeric thrust bearing having a PV limit in a lubricated environment of about 1,100,000 psi-fpm (23540 kg/cm²×m/min) or more.

2. The polymeric thrust bearing of claim 1, wherein the polymeric thrust bearing has a coefficient of friction of 0.04 or less, and wherein the coefficient of friction is determined by the modified ASTM D 3702 method.

3. The polymeric thrust bearing of claim 1, wherein the polymeric thrust bearing has a wear factor of about 1 or less, and wherein the wear factor is determined by the modified ASTM D 3702 method.

4. The polymeric thrust bearing of claim 1, wherein the at least one polymer having a glass transition temperature of at least about 140° C. is an aromatic polyimide, a poly(aryl ether ketone), a polybenzimidazole or a combination thereof.

5. The polymeric thrust bearing of claim 4 wherein the aromatic polyimide is a polyamide-imide.

6. The polymeric thrust bearing of claim 1, wherein the at least one friction and wear additive is selected from the group consisting of polytetrafluoroethylene, graphite, molybdenum disulfide, carbon fiber, and combinations thereof.

7. The polymeric thrust bearing of claim 1, wherein the annular bearing body is a single part consisting of the polymer composition.

8. A method comprising:
   subjecting the polymeric thrust bearing according to claim 1 to a velocity and a pressure such that the product of the 13. The polymeric thrust bearing of claim 1, wherein the bearing body is a single part consisting of the polymer composition.

14. A polymeric thrust bearing for an ultra-high PV environment comprising:
   an annular bearing body having a mating surface extending between an inner perimeter and an outer perimeter;
   a plurality of lubricant channels extending across the annular bearing body from the inner perimeter to the outer perimeter;
   wherein said lubricant channels occupy about 5% to about 25% of the surface area of the mating surface;
   wherein the annular bearing body comprises a polymer composition comprising at least one aromatic polyimide and/or at least one poly(aryl ether ketone), and at least one friction and wear additive; and
   wherein the polymeric thrust bearing has a PV limit in a lubricated environment of about 1,100,000 psi-fpm (23540 kg/cm²×m/min) or more.

15. The polymeric thrust bearing of claim 14, wherein the bearing body is a single part consisting of the polymer composition.

16. A system comprising:
   a powertrain component comprising a polymeric bearing article, which bearing article comprises an annular bearing body comprising a polymer composition comprising a polymer having a glass transition temperature of at least about 140° C. and at least one friction and wear additive, having a mating surface extending between an inner perimeter and an outer perimeter, and having a plurality of lubricant channels extending across the mating surface from the inner perimeter to the outer perimeter and occupying about 5% to about 25% of the surface area of the mating surface,
   wherein the powertrain component is configured to subject the polymeric bearing article to a velocity and a pressure such that the product of the velocity and the pressure is about 1,100,000 psi-fpm (23540 kg/cm²×m/min) or more.

17. The system of claim 16, wherein the powertrain component comprises a rotating component adjacent to and interfacing with the polymeric bearing article.

18. The system of claim 17, wherein the rotating component subjects the polymeric bearing article to a load of about 200 psi (14.06 kg/cm$^2$) to about 2500 psi (175.75 kg/cm$^2$) and a speed of about 440 fpm (134.11 m/min) to about 5500 fpm.

19. The system of claim 18, wherein the speed is about 3000 fpm to about 5500 fpm.

20. The system of claim 16, wherein the polymeric bearing article comprises a polymer composition comprising at least one aromatic polyimide and at least one friction and wear additive.

21. The system of claim 16, wherein the bearing body is a single part consisting of the polymer composition.

* * * * *